United States Patent
Herbst

(10) Patent No.: US 10,058,120 B2
(45) Date of Patent: Aug. 28, 2018

(54) METHOD AND APPARATUS FOR IMPROVING EFFICIENCY AND RELIABILITY OF STILLAGE PROCESSING

(71) Applicant: Kent K. Herbst, St. Michael, MN (US)

(72) Inventor: Kent K. Herbst, St. Michael, MN (US)

( * ) Notice: Subject to any disclaimer, the term of this patent is extended or adjusted under 35 U.S.C. 154(b) by 373 days.

(21) Appl. No.: 15/149,397

(22) Filed: May 9, 2016

(65) Prior Publication Data

US 2016/0324205 A1  Nov. 10, 2016

Related U.S. Application Data

(60) Provisional application No. 62/159,246, filed on May 9, 2015.

(51) Int. Cl.
| | |
|---|---|
| A23K 10/38 | (2016.01) |
| A23N 17/00 | (2006.01) |
| B01D 1/00 | (2006.01) |
| B01D 21/26 | (2006.01) |
| B01D 3/00 | (2006.01) |
| B01D 3/14 | (2006.01) |
| C12F 3/10 | (2006.01) |

(52) U.S. Cl.
CPC ............ *A23N 17/008* (2013.01); *A23K 10/38* (2016.05); *B01D 1/00* (2013.01); *B01D 3/002* (2013.01); *B01D 3/143* (2013.01); *B01D 21/262* (2013.01); *B01D 21/267* (2013.01); *C12F 3/10* (2013.01); *Y02P 60/873* (2015.11)

(58) Field of Classification Search
CPC .... A23K 10/38; A23N 17/007; A23N 17/008; B01D 1/00; B01D 3/002; B01D 3/143; B01D 21/262; B01D 21/267; C12F 3/10; Y02P 60/873

See application file for complete search history.

(56) References Cited

U.S. PATENT DOCUMENTS

| | | |
|---|---|---|
| 4,552,775 A | 11/1985 | Baeling et al. |
| 4,952,504 A | 8/1990 | Pavilon |
| 5,662,810 A | 9/1997 | Willgohs |
| 5,958,233 A | 9/1999 | Willgohs |
| 7,143,690 B2 | 12/2006 | Borjesson et al. |
| 7,381,329 B1 | 6/2008 | Moss |
| 7,497,955 B2 | 3/2009 | Scheimann et al. |
| 7,641,928 B2 | 1/2010 | Jump et al. |
| 8,168,037 B2 | 5/2012 | Winsness |
| 8,256,134 B2 | 9/2012 | Rehkopf et al. |
| 8,679,353 B2 | 3/2014 | Winsness |
| 8,778,433 B2 | 7/2014 | Lee |
| 8,986,551 B2 | 3/2015 | Kohl et al. |

(Continued)

OTHER PUBLICATIONS

D.A. Monceaux and D. Kuehner, "Dryhouse technologies and DDGS production," Chapter 21, The Alcohol Textbook, 5th Edition, 2009, Lallemand Ethanol Technology and Nottingham University Press.

*Primary Examiner* — Lucas A Stelling
(74) *Attorney, Agent, or Firm* — Mitchell A. Rossman; Terra Nova Patent Law, PLLC

(57) ABSTRACT

The present invention provides an apparatus for dewatering a feed stream of aqueous solids residual from a fermentation and distillation process. The apparatus includes: a first separation device; a mixing tank; an evaporator; a second separation device; and an optional third separation device. Methods for dewatering a feed stream of aqueous solids residual from a fermentation and distillation process are also provided.

20 Claims, 18 Drawing Sheets

(56) References Cited

U.S. PATENT DOCUMENTS

| | | |
|---|---|---|
| 9,012,668 B2 | 4/2015 | Winsness |
| 9,108,140 B2 | 8/2015 | Winsness |
| 9,320,990 B2 | 4/2016 | Winsness |
| 2007/0254089 A1 | 11/2007 | Hickey et al. |
| 2008/0110838 A1 | 5/2008 | Moss |
| 2014/0317945 A1 | 10/2014 | Lee |
| 2014/0319066 A1 | 10/2014 | LoCascio et al. |
| 2015/0076078 A1 | 3/2015 | Gallop |

METHOD AND APPARATUS FOR IMPROVING EFFICIENCY AND RELIABILITY OF STILLAGE PROCESSING

RELATED APPLICATIONS

This application claims priority to U.S. Provisional Patent Application Ser. No. 62/159,246 filed May 9, 2015, which is hereby incorporated by reference in its entirety for all purposes.

BACKGROUND OF THE INVENTION

The present invention relates to dewatering aqueous-solids by-product streams in alcohol production from grains and plant fibers. More specifically, this invention relates to an improved method for dewatering such stillage to produce solids useful for animal feeds.

In the production of fuel alcohol from plant materials, the biomass is mixed with hot water to produce a wort. The wort is fermented until the final alcohol level is reached. The fermented contents are typically discharged as a slurry to a beer well and to a beer still, which removes the alcohol by distillation. After distillation, the reminder typically includes still bottoms, stillage or whole stillage, and consists mostly of water with spent solids.

The whole stillage has a complex composition. For example, whole stillage from corn fermentation includes non-fermented fibers from the hull and tip cap, particles of the corn germ, oil and other lipids, non-fermented portions including gluten, un-reacted starches, soluble proteins and enzymes, and dead yeast cells. The particle sizes range widely from about 1-2 millimeters to below about 10 microns. Typically, this stillage is dewatered to produce animal feed, which helps offset the waste disposal costs.

What is needed is an apparatus and method for dewatering whole stillage that requires less energy, reduces the amount of suspended solids reaching the evaporator, and recovers beneficial nutrients.

SUMMARY OF THE INVENTION

The present invention provides an apparatus for dewatering a feed stream of aqueous solids residual from a fermentation and distillation process that achieves surprising and unexpected results. The apparatus includes: a first separation device; a mixing tank; an evaporator; a second separation device; and an optional third separation device. Methods for dewatering a feed stream of aqueous solids residual from a fermentation and distillation process are also provided.

The present invention provides a new process and apparatus to efficiently dewater aqueous solids residual after fermentation and distillation, for example, corn stillage. The feed stream of aqueous solids slurry is fractionated into two or more sub-streams in such a way that one of the sub-streams contains predominately heavy particulate solids and has substantially improved free-draining characteristics. A second sub-stream contains reduced entrained fines of the heavy particles and a major portion of the liquid from the feed stream and is fed to an evaporation process as well as returned to the beginning of the production process. The liquid fed to the evaporator has reduced suspended solids, thereby increasing the efficiency, capacity, and reliability associated with evaporating the liquid stream. The free-draining sub-stream is subsequently pretreated by adjusting pH, adjusting temperature, and/or adding dewatering aides. This pretreated free-draining sub-stream is dewatered using devices, for example, a bowl decanter, screen centrifuge, belt press, screw press, or any other solids/liquid separation device, all of which produce a cake of relatively high solids content. This lower moisture cake reduces the energy requirements associated with drying and may potentially have characteristics that make the resulting Dry Distillers Grain (DDG) less sticky and promote less maintenance related to the dryer operations. The remaining liquid from the feed stream may have elevated nutrient content that can promote increased fermentation efficiencies and may either be recycled as backset to reduce water usage or concentrated in an evaporator, before being mixed with the dewatered solids which may be dried to produce an animal feed.

The apparatus and method provided by the present invention provide the following advantages over the prior art. For example, the reduction of the solids content in the wet cake coming out of the first separation device is significant. Most processing plants operate about 32-35 weight percent (wt %) dry solids in order to optimize the balance in energy usage in the dryers and the amount of solids that pass into the centrate. Under the present invention, the weight percent (wt %) dry solids could be reduced to less than about 30 weight percent (wt %) dry solids and this would improve the centrate quality by reducing the amount of small suspended solids. Further, additional corn oil may be released from the solids due to the elevation of temperature and/or pressure of the dewatering process.

The present invention provides an apparatus for dewatering a feed stream of aqueous solids residual from a fermentation and distillation process. The apparatus includes: a first separation device including a centrifuge to clarify a stream of aqueous solids into a first sub-stream and a second sub-stream; a mixing tank in fluid connection with the first separation device to receive the first sub-stream and to provide a third sub-stream an evaporator in fluid communication to the first separation device to receive the second sub-stream and to provide a fourth sub-stream to the mixing tank; a second separation device in fluid connection with the mixing tank to receive the third sub-stream and to clarify the third sub-stream into a fifth sub-stream and a sixth sub-stream, and wherein the second separation device includes a screw press, a centrifuge, a rotary vacuum-drum filter, or a belt filter press.

In one embodiment, the centrifuge is a solid bowl decanter centrifuge. In one embodiment, the apparatus further includes a first transfer pump in fluid communication with the second separation device and the mixing tank. In one embodiment, the apparatus further includes second transfer pump in fluid communication with the first separation device and a beer column. In one embodiment, the second transfer pump is to deliver the stream of aqueous solids from the beer column to the first separation device. In one embodiment, the apparatus further includes one or more pH adjusting apparatuses in fluid communication with the mixing tank. In one embodiment, the apparatus further includes one or more boiler blowdown apparatuses in fluid communication with the mixing tank. In one embodiment, the apparatus further includes one or more dewatering aide apparatuses in fluid communication with the mixing tank and the third sub-stream. In one embodiment, the feed stream of aqueous solids residual is from a fermentation and distillation process using corn or milo. In one embodiment, the apparatus further includes a dryer in fluid communication with second separation device for drying the fifth sub-stream. In one embodiment, the evaporator is in fluid communication with the dryer and provides a syrup to the fifth sub-stream. In one embodiment, the screen bend has a screen opening size from about microns to about 500 microns.

The present invention provides an apparatus for dewatering a feed stream of aqueous solids residual from a fermentation and distillation process. The apparatus includes: a first separation device including a solid bowl decanter centrifuge to clarify a stream of aqueous solids into a first sub-stream and a second sub-stream; a mixing tank in fluid connection with the first separation device to receive the first sub-stream and to provide a third sub-stream; one or more pH adjusting apparatuses in fluid communication with the mixing tank; one or more boiler blowdown apparatuses in fluid communication with the mixing tank; one or more dewatering aide apparatuses in fluid communication with the mixing tank and the third sub-stream; an evaporator in fluid communication to the first separation device to receive the second sub-stream and to provide a fourth sub-stream to the mixing tank; a second separation device including a screw press in fluid connection with the mixing tank to receive the third sub-stream and to clarify the third sub-stream into a fifth sub-stream and a sixth sub-stream; a dryer in fluid communication with second separation device for drying the fifth sub-stream, and wherein the evaporator is in fluid communication with the dryer and provides a syrup to the fifth sub-stream.

In one embodiment, the apparatus further includes a first transfer pump in fluid communication with the second separation device and the mixing tank. In one embodiment, the apparatus further includes a second transfer pump in fluid communication with the first separation device and a beer column. In one embodiment, the second transfer pump is to deliver the stream of aqueous solids from the beer column to the first separation device. In one embodiment, the feed stream of aqueous solids residual is from a fermentation and distillation process using corn or milo.

The present invention provides an apparatus for dewatering a feed stream of aqueous solids residual from a fermentation and distillation process using corn or milo. The apparatus includes: a first separation device including a solid bowl decanter centrifuge to clarify a stream of aqueous solids into a first sub-stream and a second sub-stream; a mixing tank in fluid connection with the first separation device to receive the first sub-stream and to provide a third sub-stream; one or more pH adjusting apparatuses in fluid communication with the mixing tank; one or more boiler blowdown apparatuses in fluid communication with the mixing tank; one or more dewatering aide apparatuses in fluid communication with the mixing tank and the third sub-stream; an evaporator in fluid communication to the first separation device to receive the second sub-stream and to provide a fourth sub-stream to the mixing tank; a second separation device including a screw press in fluid connection with the mixing tank to receive the third sub-stream and to clarify the third sub-stream into a fifth sub-stream and a sixth sub-stream; a dryer in fluid communication with second separation device for drying the fifth sub-stream, and wherein the evaporator is in fluid communication with the dryer and provides a syrup to the fifth sub-stream.

In one embodiment, the apparatus further includes a first transfer pump in fluid communication with the second separation device and the mixing tank. In one embodiment, the apparatus further includes a second transfer pump in fluid communication with the first separation device and a beer column. In one embodiment, the second transfer pump is to deliver the stream of aqueous solids from the beer column to the first separation device.

The present invention provides an apparatus for dewatering a feed stream of aqueous solids residual from a fermentation and distillation process. The apparatus includes: a first separation device including a centrifuge to clarify a stream of aqueous solids into a first sub-stream and a second sub-stream; a mixing tank in fluid connection with the first separation device to receive the first sub-stream and to provide a third sub-stream; an evaporator in fluid communication to the first separation device to receive the second sub-stream and to provide a fourth sub-stream to the mixing tank; a second separation device in fluid connection with the mixing tank to receive the third sub-stream and to clarify the third sub-stream into a fifth sub-stream and a sixth sub-stream, wherein the second separation device includes a hydrocyclone, a screen bend, or a clarifier; a third separation device in fluid connection with the second separation device and to receive the sixth sub-stream and to clarify the sixth sub-stream into a seventh sub-stream and an eighth sub-stream, and wherein the third separation device includes a screw press, a centrifuge, or a belt filter press.

In one embodiment, the first sub-stream includes less than about 32 weight percent (wt %) total solids, preferably less than about 30 weight percent (wt %) total solids. In one embodiment, the second sub-stream includes from about 2 weight percent (wt %) total solids to about 12 weight percent (wt %) total solids, preferably from about 3 weight percent (wt %) total solids to about 10 weight percent (wt %) total solids. In one embodiment, the third sub-stream includes from about 2 weight percent (wt %) total solids to about 14 weight percent (wt %) total solids, preferably from about 4 weight percent (wt %) total solids to about 12 weight percent (wt %) total solids. In one embodiment, the fifth sub-stream includes from about 1 weight percent (wt %) total solids to about 20 weight percent (wt %) total solids, preferably from about 4 weight percent (wt %) total solids to about 18 weight percent (wt %) total solids. In one embodiment, the sixth sub-stream includes from about 4 weight percent (wt %) total solids to about 18 weight percent (wt %) total solids, preferably from about 6 weight percent (wt %) total solids to about 15 weight percent (wt %) total solids. In one embodiment, the seventh sub-stream includes from greater than about 34 weight percent (wt %) total solids, preferably greater than about 34 weight percent (wt %) total solids. In one embodiment, the eighth sub-stream includes from about 2 weight percent (wt %) total solids to about 12 weight percent (wt %) total solids, preferably from about 3 weight percent (wt %) total solids to about 10 weight percent (wt %) total solids. In one embodiment, the centrifuge is a solid bowl decanter centrifuge. In one embodiment, the apparatus further includes a first transfer pump in fluid communication with the second separation device and the mixing tank. In one embodiment, the apparatus further includes a second transfer pump in fluid communication with the first separation device and a beer column. In one embodiment, the second transfer pump is to deliver the stream of aqueous solids from the beer column to the first separation device. In one embodiment, the apparatus further includes one or more pH adjusting apparatuses in fluid communication with the mixing tank. In one embodiment, the apparatus further includes one or more boiler blowdown apparatuses in fluid communication with the mixing tank. In one embodiment, the apparatus further includes one or more dewatering aide apparatuses in fluid communication with the mixing tank and the sixth sub-stream. In one embodiment, the feed stream of aqueous solids residual is from a fermentation and distillation process using corn or milo. In one embodiment, the apparatus further includes a dryer in fluid communication with third separation device for drying the seventh sub-stream. In one embodiment, the evaporator is in fluid communication with the dryer and provides a syrup to the seventh sub-stream. In one embodiment, the screen bend has a screen opening size from about microns to about 500 microns.

The present invention provides an apparatus for dewatering a feed stream of aqueous solids residual from a fermentation and distillation process. The apparatus includes: a first separation device including a solid bowl decanter centrifuge to clarify a stream of aqueous solids into a first sub-stream and a second sub-stream; a mixing tank in fluid connection with the first separation device to receive the first sub-stream and to provide a third sub-stream; an evaporator in fluid communication to the first separation device to receive the second sub-stream and to provide a fourth sub-stream to the mixing tank; a second separation device including a hydrocyclone in fluid connection with the mixing tank to receive the third sub-stream and to clarify the third sub-stream into a fifth sub-stream and a sixth sub-stream; a third separation device including a screw press in fluid connection with the second separation device and to receive the sixth sub-stream and to clarify the sixth sub-stream into a seventh sub-stream and an eighth sub-stream; a dryer in fluid communication with third separation device for drying the seventh sub-stream, and wherein the evaporator is in fluid communication with the dryer and provides a syrup to the seventh sub-stream.

In one embodiment, the apparatus further includes a first transfer pump in fluid communication with the second separation device and the mixing tank. In one embodiment, the apparatus further includes a second transfer pump in fluid communication with the first separation device and a beer column. In one embodiment, the second transfer pump is to deliver the stream of aqueous solids from the beer column to the first separation device. In one embodiment, the apparatus further includes one or more pH adjusting apparatuses in fluid communication with the mixing tank. In one embodiment, the apparatus further includes one or more boiler blowdown apparatuses in fluid communication with the mixing tank. In one embodiment, the apparatus further includes one or more dewatering aide apparatuses in fluid communication with the mixing tank and the sixth sub-stream. In one embodiment, the feed stream of aqueous solids residual is from a fermentation and distillation process using corn or milo.

The present invention provides an apparatus for dewatering a feed stream of aqueous solids residual from a fermentation and distillation process using corn or milo. The apparatus includes: a first separation device including a solid bowl decanter centrifuge to clarify a stream of aqueous solids into a first sub-stream and a second sub-stream; a mixing tank in fluid connection with the first separation device to receive the first sub-stream and to provide a third sub-stream; an evaporator in fluid communication to the first separation device to receive the second sub-stream and to provide a fourth sub-stream to the mixing tank; a second separation device including a hydrocyclone in fluid connection with the mixing tank to receive the third sub-stream and to clarify the third sub-stream into a fifth sub-stream and a sixth sub-stream; a third separation device including a screw press in fluid connection with the second separation device and to receive the sixth sub-stream and to clarify the sixth sub-stream into a seventh sub-stream and an eighth sub-stream; a dryer in fluid communication with third separation device for drying the seventh sub-stream, wherein the evaporator is in fluid communication with the dryer and provides a syrup to the seventh sub-stream; one or more pH adjusting apparatuses in fluid communication with the mixing tank; one or more boiler blowdown apparatuses in fluid communication with the mixing tank; and one or more dewatering aide apparatuses in fluid communication with the mixing tank and the sixth sub-stream.

In one embodiment, the apparatus further includes a first transfer pump in fluid communication with the second separation device and the mixing tank. In one embodiment, the apparatus further includes a second transfer pump in fluid communication with the first separation device and a beer column. In one embodiment, the second transfer pump is to deliver the stream of aqueous solids from the beer column to the first separation device.

The present invention provides a method for dewatering a feed stream of aqueous solids residual from a fermentation and distillation process. The method includes: clarifying a feed stream of aqueous solids residual into a first sub-stream and a second sub-stream using a first separation device including a centrifuge; mixing the first sub-stream with one or more pH adjusting aides, one or more dewatering aides, water, or a combination thereof in a mixing tank to provide a third sub-stream; clarifying the third sub-stream into a fourth sub-stream and an fifth sub-stream using a second separation device and wherein the third separation device includes a screw press, a centrifuge, or a belt filter press.

In one embodiment, the centrifuge is a solid bowl decanter centrifuge. In one embodiment, the feed stream of aqueous solids residual is from a fermentation and distillation process using corn or milo. In one embodiment, the one or more pH adjusting aides comprise acids, bases, buffers, or a combination thereof. In one embodiment, the one or more pH adjusting aides are each independently added to the first sub-stream in an amount to obtain a pH from about 7 to about 12. In one embodiment, the one or more dewatering aides each independently comprise one or more anionic polymers, one or more cationic polymers, one or more coagulants, or a combination thereof. In one embodiment, the one or more dewatering aides are each independently added to the first sub-stream in an amount from about 1 to about 2000 parts per million (ppm). In one embodiment, the method further includes clarifying the second sub-stream using an evaporator to provide a fifth sub-stream to the mixing tank and a syrup to a dryer. In one embodiment, the method further includes drying the fourth sub-stream, the syrup, or a combination thereof in the dryer. In one embodiment, the method further includes delivering the sixth sub-stream to the mixing tank. In one embodiment, the method further includes adjusting a temperature of the third sub-stream from about 80° C. to about 110° C.

The present invention provides a method for dewatering a feed stream of aqueous solids residual from a fermentation and distillation process. The method includes: clarifying a feed stream of aqueous solids residual into a first sub-stream and a second sub-stream using a first separation device including a solid bowl decanter centrifuge; mixing the first sub-stream with one or more pH adjusting aides, dewatering aides, water, or a combination thereof in a mixing tank to provide a third sub-stream; and clarifying the third sub-stream into a fourth sub-stream and an fifth sub-stream using a second separation device including a screw press.

The present invention provides a method for dewatering a feed stream of aqueous solids residual from a fermentation and distillation process using corn or milo. The method includes: clarifying a feed stream of aqueous solids residual into a first sub-stream and a second sub-stream using a first separation device including a solid bowl decanter centrifuge;

mixing the first sub-stream with one or more pH adjusting aides, dewatering aides, water, or a combination thereof in a mixing tank to provide a third sub-stream; and clarifying the third sub-stream into a fourth sub-stream and an fifth sub-stream using a second separation device including a screw press.

The present invention provides a method for dewatering a feed stream of aqueous solids residual from a fermentation and distillation process. The method includes: clarifying a feed stream of aqueous solids residual into a first sub-stream and a second sub-stream using a first separation device including a centrifuge; mixing the first sub-stream with one or more pH adjusting aides, dewatering aides, water, or a combination thereof in a mixing tank to provide a third sub-stream; clarifying the third sub-stream into a fourth sub-stream and an fifth sub-stream using a second separation device, wherein the second separation device includes a hydrocyclone, a screen bend, or a clarifier; clarifying the fifth sub-stream into a sixth sub-stream and an seventh sub-stream using a third separation device, and wherein the third separation device includes a screw press, a centrifuge, or a belt filter press.

In one embodiment, the centrifuge is a solid bowl decanter centrifuge. In one embodiment, the first sub-stream includes less than about 32 weight percent (wt %) total solids, preferably less than about 30 weight percent (wt %) total solids. In one embodiment, the second sub-stream includes from about 2 weight percent (wt %) total solids to about 12 weight percent (wt %) total solids, preferably from about 3 weight percent (wt %) total solids to about 10 weight percent (wt %) total solids. In one embodiment, the third sub-stream includes from about 2 weight percent (wt %) total solids to about 14 weight percent (wt %) total solids, preferably from about 4 weight percent (wt %) total solids to about 12 weight percent (wt %) total solids. In one embodiment, the fourth sub-stream includes from about 1 weight percent (wt %) total solids to about 20 weight percent (wt %) total solids, preferably from about 4 weight percent (wt %) total solids to about 12 weight percent (wt %) total solids. In one embodiment, the fifth sub-stream includes from about 4 weight percent (wt %) total solids to about 18 weight percent (wt %) total solids, preferably from about 6 weight percent (wt %) total solids to about 15 weight percent (wt %) total solids. In one embodiment, the sixth sub-stream includes from greater than about 34 weight percent (wt %) total solids, preferably greater than about 35 weight percent (wt %) total solids. In one embodiment, the seventh sub-stream includes from about 2 weight percent (wt %) total solids to about 12 weight percent (wt %) total solids, preferably from about 3 weight percent (wt %) total solids to about 10 weight percent (wt %) total solids. In one embodiment, the screen bend has a screen opening size from about microns to about 500 microns. In one embodiment, the feed stream of aqueous solids residual is from a fermentation and distillation process using corn or milo. In one embodiment, the one or more pH adjusting aides comprise acids, bases, buffers, or a combination thereof. In one embodiment, the one or more pH adjusting aides are each independently added to the first sub-stream in an amount to obtain a pH from about 7 to about 12. In one embodiment, the one or more dewatering aides each independently comprise one or more anionic polymers, one or more cationic polymers, one or more coagulants, or a combination thereof. In one embodiment, the one or more dewatering aides are each independently added to the first sub-stream in an amount from about 1 to about 2000 parts per million (ppm). In one embodiment, the method further includes clarifying the second sub-stream using an evaporator to provide a fourth sub-stream to the mixing tank and a syrup to a dryer. In one embodiment, the method further includes drying the fourth sub-stream, the syrup, or a combination thereof in the dryer. In one embodiment, the method further includes delivering the seventh sub-stream to the mixing tank. In one embodiment, the method further includes adjusting a temperature of the third sub-stream from about 80° C. to about 110° C.

The present invention provides a method for dewatering a feed stream of aqueous solids residual from a fermentation and distillation process. The method includes: clarifying a feed stream of aqueous solids residual into a first sub-stream and a second sub-stream using a first separation device including a solid bowl decanter centrifuge; mixing the first sub-stream with one or more pH adjusting aides, dewatering aides, water, or a combination thereof in a mixing tank to provide a third sub-stream; clarifying the second sub-stream using an evaporator to provide a fourth sub-stream to the mixing tank and a syrup to a dryer; clarifying the third sub-stream into a fourth sub-stream and an fifth sub-stream using a second separation device including a hydrocyclone; clarifying the fifth sub-stream into a sixth sub-stream and an seventh sub-stream using a third separation device including a screw press; delivering the seventh sub-stream to the mixing tank; and drying the fourth sub-stream, the syrup, or a combination thereof in the dryer.

In one embodiment, the feed stream of aqueous solids residual is from a fermentation and distillation process using corn or milo. In one embodiment, the method further includes adjusting a temperature of the third sub-stream from about 80° C. to about 110° C.

The present invention provides a method for dewatering a feed stream of aqueous solids residual from a fermentation and distillation process using corn or milo. The method includes: clarifying a feed stream of aqueous solids residual into a first sub-stream and a second sub-stream using a first separation device including a solid bowl decanter centrifuge; mixing the first sub-stream with one or more pH adjusting aides, dewatering aides, water, or a combination thereof in a mixing tank to provide a third sub-stream; clarifying the second sub-stream using an evaporator to provide a fourth sub-stream to the mixing tank and a syrup to a dryer; clarifying the third sub-stream into a fourth sub-stream and an fifth sub-stream using a second separation device including a hydrocyclone; clarifying the fifth sub-stream into a sixth sub-stream and an seventh sub-stream using a third separation device including a screw press; delivering the seventh sub-stream to the mixing tank; and drying the fourth sub-stream, the syrup, or a combination thereof in the dryer.

In one embodiment, the method further includes adjusting a temperature of the third sub-stream from about 80° C. to about 110° C.

A further understanding of the nature and advantages of the invention may be realized by reference to the remaining portions of the specification and the drawings.

BRIEF DESCRIPTION OF THE DRAWINGS

Embodiments of the invention may be best understood by referring to the following description and accompanying drawings, which illustrate such embodiments.

In the drawings.

Figure 1:
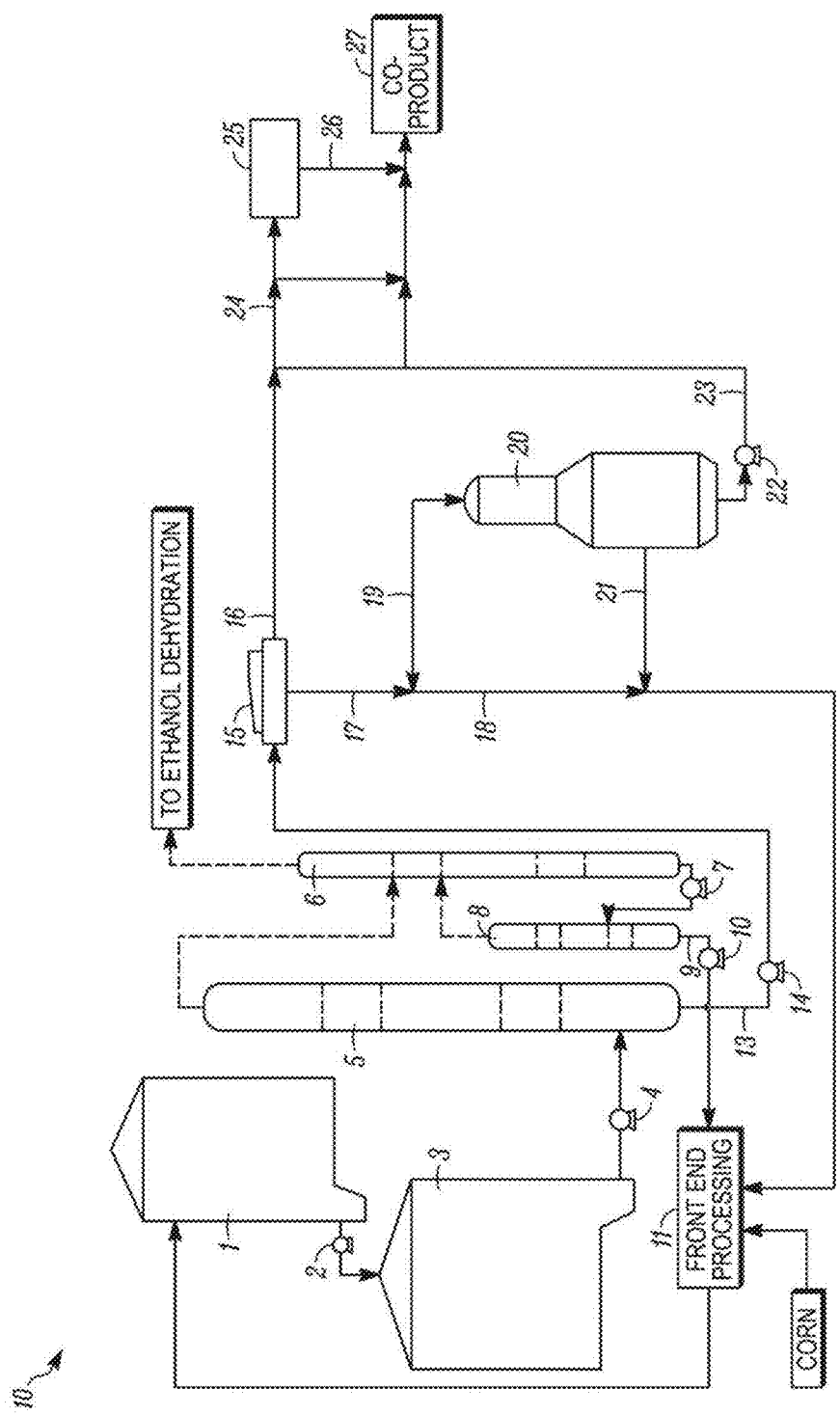
FIG. 1 shows a schematic flowchart of an apparatus and corresponding method in the prior art for dewatering stillage.

The drawings are not necessarily to scale. Like numbers used in the figures refer to like components, steps, and the like. However, it will be understood that the use of a number to refer to a component in a given figure is not intended to limit the component in another figure labeled with the same number.

DETAILED DESCRIPTION OF THE INVENTION

The present invention provides an apparatus for dewatering a feed stream of aqueous solids residual from a fermentation and distillation process that achieves surprising and unexpected results. The apparatus includes: a first separation device; a mixing tank; an evaporator; a second separation device; and an optional third separation device. Methods for dewatering a feed stream of aqueous solids residual from a fermentation and distillation process are also provided.

The various embodiments provide suspended solids separation systems and methods related thereto. Although the systems and methods described herein focus primarily on separating suspended solids from whole stillage resulting from ethanol production, any of the systems and methods described herein can be used to separate suspended solids from other types of bio-product process streams, including, for example, various other alcohol streams, for example, butanol (e.g., isobutanol), biochemical streams, and the like.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

The referenced items are provided solely for their disclosure prior to the filing date of the present application. Nothing herein is to be construed as an admission that the present invention is not entitled to antedate such material by virtue of prior invention.

Unless otherwise indicated, the words and phrases presented in this document have their ordinary meanings to one of skill in the art. Such ordinary meanings can be obtained by reference to their use in the art and by reference to general and scientific dictionaries, for example, *Webster's Third New International Dictionary*, Merriam-Webster Inc., Springfield, Mass., 1993 and *The American Heritage Dictionary of the English Language*, Houghton Mifflin, Boston Mass., 1981.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "about" refers to a variation of 10 percent of the value specified; for example about 50 percent carries a variation from 45 to 55 percent.

As used herein, the term "acid" refers to a compound or substance used to decrease the pH of a material or the environment of use of that material.

As used herein, the term "and/or" refers to any one of the items, any combination of the items, or all of the items with which this term is associated.

As used herein, the singular forms "a," "an," and "the" include plural reference unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As used herein, the phrase "aqueous phase" refers to a process stream containing primarily water and solids.

As used herein, the term "base" refers to a compound or substance used to increase the pH of a material or the environment of use of that material.

As used herein, the "biofuel" refers to any renewable solid, liquid or gaseous fuel produced biologically.

As used herein, the term "buffer" refers to a composition that resists changes in the pH.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the term "dewatering" refers to the removal of liquid from a fluid including both solids and liquids.

As used herein, the phrase "Dry Distillers Grain (DDG)" refers to any form of distillers grains and distillers grains with a water content less than about 20 weight percent (wt %) total solids As used herein, the phrase "Dry Distillers Grain with Solubles (DDGS)" refers to refers to any form of distillers grains with solubles with a water content less than about 20 weight percent (wt %) total solids As used herein, the "dissolved solids" or "solubles" refers to solid particles that are mixed sufficiently with the fluid in a process steam such that they do not separate from the process stream during mechanical processing.

As used herein, the "evaporation" refers to removal or vaporization of a solvent.

As used herein, the phrase "in fluid communication" refers to an available liquid flow path from a first region or location in a device to a second region or location in the device.

As used herein, the terms "include," "for example," "such as," and the like are used illustratively and are not intended to limit the present invention.

As used herein, the term "liquid" refers to a substance that undergoes continuous deformation under a shearing stress. See, e.g., *Concise Chemical and Technical Dictionary*, $4^{th}$ Edition, Chemical Publishing Co., Inc., p. 707, New York, N.Y. (1986).

As used herein, the phrase "operatively coupled" refers to bringing two or more items together or into relationship with each other such that they may operate together or allow transfer of information between the two or more items.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the term "stillage" refers to a co-product produced during production of a biofuel, and is sometimes referred to as "slop." When used without qualification, the term "stillage" can refer to whole stillage, thin stillage, or concentrated stillage (such as condensed distillers soluble, i.e., syrup, which can be produced from biofuel process streams, e.g., ethanol production process streams).

The term "total solids" as used herein refers to all components in a process stream other than water. When used without qualification, the term "solids" is intended to refer to total solids, by weight.

As used herein, the phrase "Wet Distillers Grain (WDG)" refers to any form of distillers grains with a water content greater than about 20 weight percent (wt %) total solids.

As used herein, the phrase "Wet Distillers Grain with Solubles (WDGS)" refers to any form of distillers grains with soluble with a water content greater than about 20 weight percent (wt %) total solids.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Grain-based ethanol can be produced from a wet mill process, a dry grind ethanol process, or a modified dry grind ethanol process as is understood in the art. Co-products produced as a result of distillation and dehydration include whole stillage, which is typically subject to a centrifugation or decanter step to separate insoluble solids ("wet cake") from the liquid (which is oftentimes referred to as "centrate" until it enters a stillage tank, if present, at which point it is sometimes referred to as "thin stillage"). In a dry grind ethanol process, stillage enters evaporators in order to boil away moisture, producing a concentrated syrup containing the soluble (dissolved) solids from the fermentation. This concentrated syrup can be mixed with the centrifuged wet cake, and the mixture sold to beef and dairy feedlots as Wet Distillers Grain with Solubles (WDGS). Alternatively, the wet cake and concentrated syrup mixture may be dried and sold as Dry Distillers Grain with Solubles (DDGS) to daily and beef feedlots.

FIG. 1 illustrates a conventional prior art process 10 for ethanol production using dent corn as the feedstock. Water, corn, enzymes and yeast are added into fermentation tanks 1 and the contents are recirculated via centrifugal pumps 2. The contents from these batch fermentation tank are transferred to a common beer well 3 to help equalize the flow for the downstream continuous operation. The beer is pumped via transfer pumps 4 to the beer column 5 and the beer traverses various heat exchangers that serve as means of energy recovery and optimization for the operations. Once in the beer column, heat is applied to separate the alcohol content from the beer and the ethanol vapors continue to a rectifier column 6 and the bottoms from the rectifier column are transferred to a stripping column 8 via transfer pumps 7. The stripping column has additional heat applied to recover any remaining alcohol and the stripper bottoms 9 are transferred via pumps 10 back to the front of the plant for Front End Processing 11. The ethanol vapors off the rectifier column are sent to additional dehydration processing 12 where the final product is created. The remaining contents from the beer column 5 is called whole stillage 13 and is pumped via transfer pumps 14 to a solid bowl decanter centrifuge 15, which separates the feed stream according to density into wet cake 16, and centrate 17. Because most corn solids are heavier than water, the wet cake 16 contains most of the solids. The centrate 17 typically has 5-10% solids, of which about half are suspended solids, the remainder being dissolved solids including proteins, acids, unreacted sugars, and others. The suspended solids in the centrate 17 are predominately fines, but there is not a sharp cut-off since some larger particles are subject to carry-over with the liquid. The centrate 17 is typically accumulated in a holding tank, from which typically 10-60% is recirculated as backset 18 to the front end processing 11 to provide nutrients and to reduce the fresh water requirements. The remainder, the thin stillage 19 of the centrate 17 is sent to the evaporator 20. The evaporator 20 concentrates the solids to a syrup 23 of typically 30-50% solids. The water evaporated off in the evaporator(s) 20 is the evaporator condensate 21 and is reused in the plant. The syrup is typically added to the wet cake 16 via transfer pumps 22 and the combined stream 24 is known as wet distillers grain with solubles (WDG/s). This is typically sent to the dryer 25 to be dried to about 10-11% moisture to afford Dry Distillers Grain with Solubles (DDGS) 26. Various combinations of Wet Distillers Grain with Solubles (WDGS), syrup 23, Dry Distillers Grain (DDG), and Dry Distillers Grain with Solubles (DDGS) can be generated by a facility to comprise the co-products 27.

Figure 2:
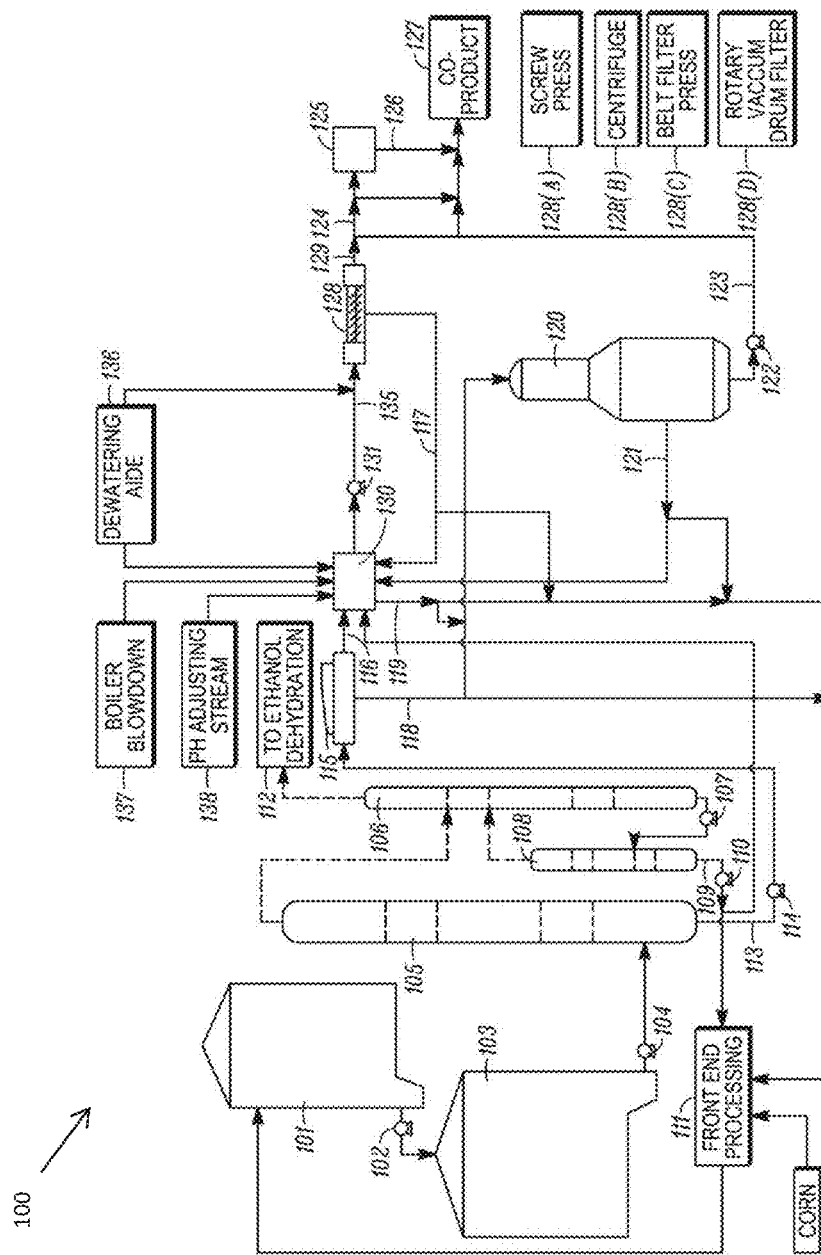
FIG. 2 shows a schematic flowchart of an apparatus and corresponding method for dewatering stillage in accordance with a first embodiment of the present invention, with flow directions indicated by arrows.

FIG. 2 shows a schematic flowchart of an apparatus 100 and corresponding method for dewatering stillage in accordance with a first embodiment of the present invention, with flow directions indicated by arrows. Aqueous solids, for example, whole stillage 113, flow from the beer column 105 to the first stage separation device 115, which classifies the flow into centrate 118 and reduced wet cake 116. In one embodiment, the first stage separation device 115 is a centrifuge. In one embodiment, the first stage separation device 115 is a rotary centrifuge. The centrate 118 is sent to one or more evaporators 120, as well as front end processing operations 111. The reduced wet cake 116 is discharged into a mix tank 130, to which is added various rinse water sources. In one embodiment, the rinse water sources would provide additional heat and may be any one or combination of side stripper bottoms 119, utility water boiler blowdown 137, evaporator condensate 121, or fresh water. In addition, the pH of the mixture in the mix tank 130 may be altered utilizing various pH adjusting streams 138. These pH adjusting streams 138 may be comprised of acids (i.e. sulfuric, hydrochloric or citric acids) as well as bases (i.e. sodium or potassium hydroxide). In addition the pH adjusting steams 138 may be comprised of waste CIP solutions collected during the sanitation processes. One or more dewatering aids may be supplied by the dewatering aide apparatus 136 to the mixing tank 130 and/or to the adjusted wet cake 135. In one embodiment, the one or more dewatering aides each independently include one or more anionic polymers, one or more cationic polymers, one or more coagulants, or a combination thereof. In one embodiment, the one or more dewatering aides are each independently added to the mixing tank 130 in an amount from about 1 to about 2000 parts per million (ppm).

The resulting adjusted wet cake 135 is pumped via transfer pump 131 to a second stage separation device 128 that typically is a screw press 128(*a*). Alternatively, this second stage separation device 128 might also be a centrifuge 128(*b*) a belt filter press 128(*c*), or a rotary vacuum drum filter 128(*d*). The centrate 117 is recycled to the mix tank 120 for addition to the adjusted wet cake 135. The wet cake 129 is discharged from the second stage separation device 128 and is sent to the dryer 125.

Syrup 123 from the evaporator 120 may be added to the wet cake 129 before the resulting Wet Distillers Grain with Solubles (WDGS) 124 are fed to the dryer 125 and are dried to produce Dry Distillers Grain with Solubles (DDGS) 126 for animal feed.

Alternatively, as is well known in the industry, the Wet Distillers Grain with Solubles (WDGS) 124 may be used as wet feed without drying. The terms syrup 123, Wet Distillers Grain with Solubles (WDGS) 124, Dry Distillers Grain with Solubles (DDGS) 126, Wet Distillers Grain (WDG), and Dry Distillers Grain (DDG) 126 are collectively referred to as co-products 127.

Figure 3:
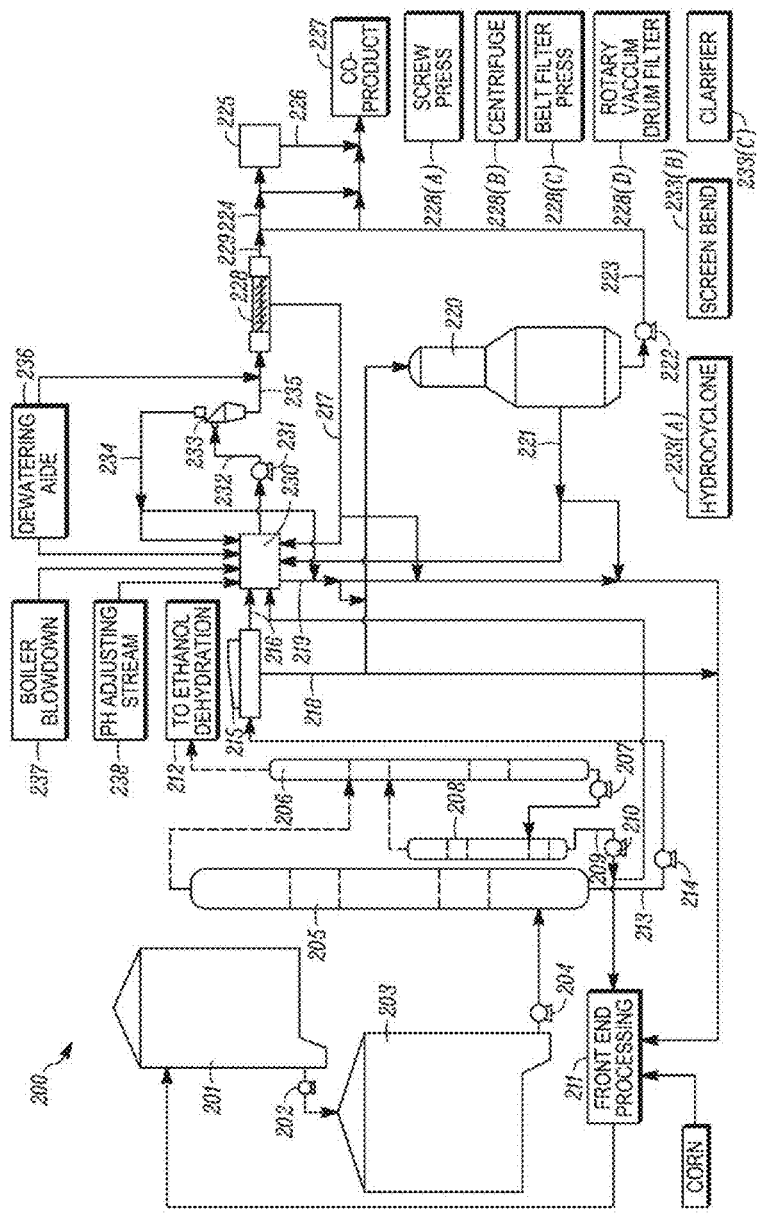
FIG. 3 shows a schematic flowchart of an apparatus and corresponding method for dewatering stillage in accordance with a first embodiment of the present invention, with flow directions indicated by arrows.

FIG. 3 shows a schematic flowchart of an apparatus 200 and corresponding method for dewatering stillage in accordance with a first embodiment of the present invention, with flow directions indicated by arrows. Aqueous solids, for example, whole stillage 213, flow from the beer column 205 to the first stage separation device 215, which classifies the flow into centrate 218 and reduced wet cake 216. In one embodiment, the first stage separation device 215 is a centrifuge. In one embodiment, the first stage separation device 215 is a rotary centrifuge. The centrate 218 is sent to one or more evaporators 220, as well as front end processing operations 211. The reduced wet cake 216 is discharged into a mix tank 230, to which is added various rinse water sources. In one embodiment, the rinse water sources would provide additional heat and may be any one or combination of side stripper bottoms 219, utility water boiler blowdown 237, evaporator condensate 221, or fresh water. In addition, the pH of the mixture in the mix tank 230 may be altered utilizing various pH adjusting streams 238. These pH adjusting streams 238 may be comprised of acids (i.e. sulfuric, hydrochloric or citric acids) as well as bases (i.e. sodium or potassium hydroxide). In addition the pH adjusting steams 238 may be comprised of waste CIP solutions collected during the sanitation processes. The resulting adjusted wet cake 232 is pumped via transfer pumps 231 to a second stage separation device 233 that is typically includes a hydrocyclone 233(*a*). Alternatively, this second stage separation device 233 might also be a screen bend 233(*b*) or a clarifier 233(*c*).

The underflow slurry 235 from the second stage separation device 233, composed primarily of large particles, is fed to a third stage separation device 228 such as a screw press 228(*a*). Alternatively, this third stage separation device 228 might also be a centrifuge 228(*b*), a belt filter press 228(*c*), or a rotary vacuum drum filter 228(*d*). The centrate 217 is recycled to the mix tank 220 for addition to the adjusted wet cake 232. The wet cake 229 is discharged from the third stage separation device 228 and is sent to the dryer 225.

The overflow 234 from the second stage separation device 233 is discharged and either sent back to the mix tank 230 to maintain desired adjusted wet cake 232 characteristics, returned as backset 219 for water and nutrient recovery, or combined with the centrate 218 and fed to the evaporator 220 for control of the water balance in the plant.

Syrup 223 from the evaporator 220 may be added to the wet cake 229 before the resulting Wet Distillers Grain with Solubles (WDGS) 224 are fed to the dryer 225 and are dried to produce Dry Distillers Grain with Solubles (DDGS) 226 for animal feed.

Alternatively, as is well known in the industry, the Wet Distillers Grain with Solubles (WDGS) 224 may be used as wet feed without drying. The terms syrup 223, Wet Distillers Grain with Solubles (WDGS) 224, Dry Distillers Grain with Solubles (DDGS) 226, Wet Distillers Grain (WDG), and Dry Distillers Grain (DDG) 226 are collectively referred to as co-products 227.

Table 1 describes the weight percent (wt %) total solids for the various streams in FIG. 3.

TABLE 1

| STREAM (REFERENCE NUMERAL) | NAME | WIDE RANGE (WT % TOTAL SOLIDS) | NARROW RANGE (WT % TOTAL SOLIDS) |
|---|---|---|---|
| 213 | Whole Stillage | 6-15% | 8-14% |
| 216 | First sub-stream or Reduced Wet Cake | <32% | <30% |
| 218 | Second sub-stream or Centrate | 2-12% | 3-10% |

TABLE 1-continued

| STREAM (REFERENCE NUMERAL) | NAME | WIDE RANGE (WT % TOTAL SOLIDS) | NARROW RANGE (WT % TOTAL SOLIDS) |
|---|---|---|---|
| 232 | Third sub-stream or Adjusted Wet Cake | 2-14% | 4-12% |
| 234 | Fifth sub-stream or Overflow | 1-20% | 4-18% |
| 235 | Sixth sub-stream or Underflow Slurry | 4-18% | 6-15% |
| 229 | Seventh sub-stream or Wet Cake | >35% | >34% |
| 217 | Eighth sub-stream or Centrate | 2-12% | 3-10% |

The differences and improvements of the present invention compared to Willgohs, U.S. Pat. Nos. 5,662,810 and 5,958,223 can be summarized as follows:

First, Willgohs' first step (see, e.g., reference numeral 11 in U.S. Pat. Nos. 5,662,810 and 5,958,223) is the incorporation of a screening mechanism rather than a production facility's existing solids/liquid separation device(s) used to dewater the whole stillage (see, e.g., reference numeral 10 in U.S. Pat. Nos. 5,662,810 and 5,958,223). The improvement provided by present invention is utilizing existing infrastructure and not imposing significant mechanical and control changes to existing infrastructure. The present invention places the treatment modifications alternatively on the wet distillers grains stream (see, e.g., reference numeral 122 in U.S. Pat. Nos. 5,662,810 and 5,958,223), thereby simplifying the number of unit operations impacted. Willgohs also discloses that treatment of the whole stillage impacts all mechanical and control aspects downstream of the whole stillage tank whereas the present invention only impacts the Wet Distillers Grain (WDG).

Second, Willgohs does not address the significant implications associated with water, material and energy balance changes induced by the incorporation of the process/apparatus in their location (i.e., on the whole stillage stream reference numeral 10 in U.S. Pat. Nos. 5,662,810 and 5,958,223) within the process. Willgohs' incorporation of a screening mechanism (see, e.g., reference numeral 11 in U.S. Pat. Nos. 5,662,810 and 5,958,223) will cause significant volumetric changes in the amount of centrate produced (see, e.g., reference numeral 13 in U.S. Pat. Nos. 5,662,810 and 5,958,223) as well as wet/solid slurry feeding dewatering device (see, e.g., reference numeral 16 in U.S. Pat. No. 5,662,810 and 5.958,223). The present invention addresses this challenge by continuing to use the primary solids/liquid separation devices and introducing modifications to only the Wet Distillers Grain (WDG) stream.

Third, Willgohs' placement of the treatment modifications on the whole stillage results in treatment of streams with different moisture content than the present invention. It is noted that Willgohs' solids content of the "overs" stream (see, e.g., reference numeral 13 in U.S. Pat. Nos. 5,662,810 and 5,958,223) is about 10-18 wt % versus the present invention stream's (e.g., reference numeral 225 in FIG. 3) solids content being ~20-30 weight percent (wt %) total solids. The present invention has the added benefit of being able to add more clean rinse water per unit of dry solids to extract additional beneficial components (i.e., sugars and oils) as well as provide more motive rinse water to help aide in the dewatering characteristics of the adjusted wet cake (see, e.g., reference numeral 235 in FIG. 3) feeding the third stage dewatering device (see. e.g., reference numeral 228 in FIG. 3).

Fourth, Willgohs' process and apparatus do not address the fines contained in the stream feeding the evaporator (see, e.g., reference numeral 13 in U.S. Pat. Nos. 5,662,810 and 5,958,223). The present invention improves evaporator performance by enabling a facility to operate their primary dewatering device (see, e.g., reference numeral 215 in FIG. 3) less efficiently from a water removal standpoint to enable the production of centrate (see, e.g., reference numeral 218 in FIG. 3) with reduced dry solids mater (see, e.g., D. A. Monceaux and D. Kuehner, "Dryhouse technologies and DDGS production," Chapter 21, The Alcohol Textbook, 5$^{th}$ Edition, 2009, Lallemand Ethanol Technology and Nottingham University Press). This helps improve evaporator performance by reducing the fouling constituents and Willgohs is not capable of making these adjustments without causing unsustainable water balance challenges.

Fifth, Willgohs disclose that the rinse water (see, e.g., reference numeral 15 in U.S. Pat. Nos. 5,662,810 and 5,958,223) is recycled process water such as side stripper bottoms or evaporator distillate. The present invention process incorporates these as well the ability for boiler blow-down water for elevating temperature as well as a pH adjustment stream. Adjusting the temperature and/or the pH is anticipated to help free additional oil from the distiller's grains, which are not currently being recovered.

Sixth, the present invention utilizes a dewatering aide to help reduce the moisture content in the distillers grains that are eventually in reference numeral 224 that feeds the dryers. This helps reduce the energy usage associated with drying.

Seventh, the present invention utilizes a dewatering aide to help minimize the "fines" (small diameter solids) recycled back into the process. This reduction of fines in the process may have beneficial impact on the viscosity of the slurry contained in the Front End Processing (see, e.g., reference numeral 211 in FIG. 3).

Finally, Willgohs is focused on reducing the amount of the water contained in wet distillers grains, as is the present invention. However. Willgohs fails to recognize the added benefit of recovering soluble constituents (i.e., sugars) that will be recycled to Front End Processing (see, e.g., reference numeral 211 in FIG. 3) and made available for fermentation to produce additional ethanol production capacity.

The specific materials and designs of additional minor components necessary to perform the process, e.g., valves, pumps, lines, and the like, are understood in the art and are not all described in detail herein. The apparatus and method can further be implemented using a variety of specific equipment available to and understood by those skilled in process control art. For example, means for sensing temperature, pressure and flow rates in all of the flow lines may be accomplished by any suitable means. It will also be appreciated by those skilled in the art that the various embodiments can include a system controller (not shown).

The system controller (not shown) can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. Such sensing devices may include, for example, devices for sensing temperatures, pressures, conductivity, pH, density, and flow rates, and transducing the same into proportional electrical signals for transmission to readout or control devices may be provided for in all of the principal fluid flow lines. Such a controller may be a local or remote receiver only, or a computer, for example, a laptop or personal computer as is well-known in the art. In one embodiment, the controller is a personal computer having all necessary components for processing input signals and generating appropriate output signals as is understood in the art. These components can include a processor, a utility, a driver, an event queue, an application, and so forth, although the embodiments are not so limited. In one embodiment, the controller has a non-volatile memory comprised of a disk drive or read only memory device that stores a program to implement the above control and store appropriate values for comparison with the process variables as is well known in the art. In other embodiments, the information is stored remotely.

In one embodiment, these components are all computer programs executed by a processor of the computer, which operates under the control of computer instructions, typically stored in a computer-readable media such as a memory. In this way, useful operations on data and other input signals can be provided by the computer's processor. The controller also desirably includes an operating system for running the computer programs, as can be appreciated by those within the art. The system controller may also comprise a machine coupled to a control panel. Buttons and dials can be provided on the control panel to allow modification of the values and to control the agricultural biofuel energy generating system to take the desired steps described herein.

The system controller can also be programmed to ignore data from the various sensors when the operator activates certain other buttons and dials on the control panel as he deems necessary, for example, fill override or emergency stop buttons. Alternatively, or in addition to the foregoing, the control panel can include indicator lights or digital displays to signal an operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action by either pushing a specific button or turning a specific dial on the control panel, or by manually adjusting the appropriate valve or device.

Additionally, as is known in the art, in implementing the system described herein, general chemical engineering principles are adhered to, including accounting for the various types of energy and materials being input to and output from the system, in order to properly size the system. This includes not only the energy associated with mass flow, but also energy transferred by heat and work. In some embodiments, the system is optimized for maximum performance utilizing any known optimization methods known in the art.

Figure 4:
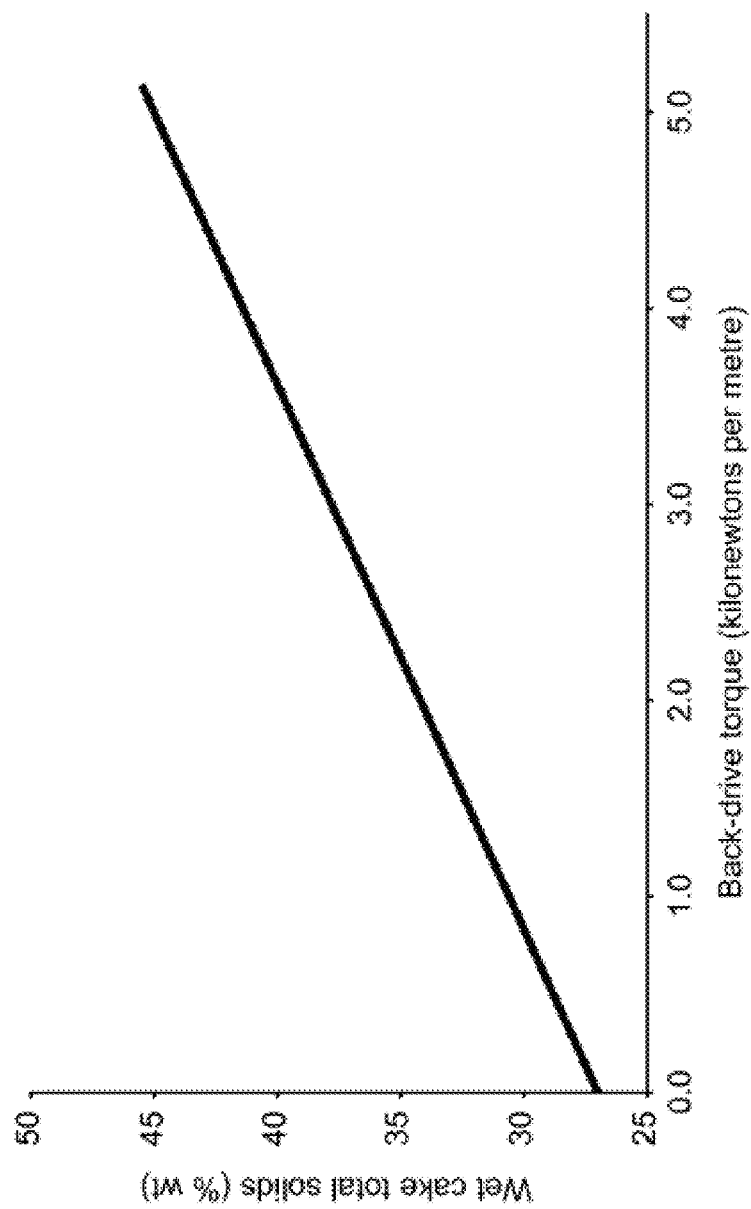
FIG. 4 illustrates the back-drive torque of an exemplary centrifuge versus the wet cake total solids.

FIG. 4 illustrates the back-drive torque of a centrifuge versus the wet cake total solids (D. A. Monceaux and D. Kuehner, "Dryhouse technologies and DDGS production," Chapter 21, The Alcohol Textbook, 5$^{th}$ Edition. 2009, Lallemand Ethanol Technology and Nottingham University Press). Having the ability to operate at a lower wet cake moisture content would provide a significant benefit in the form of reduced electrical consumption.

Figure 5:
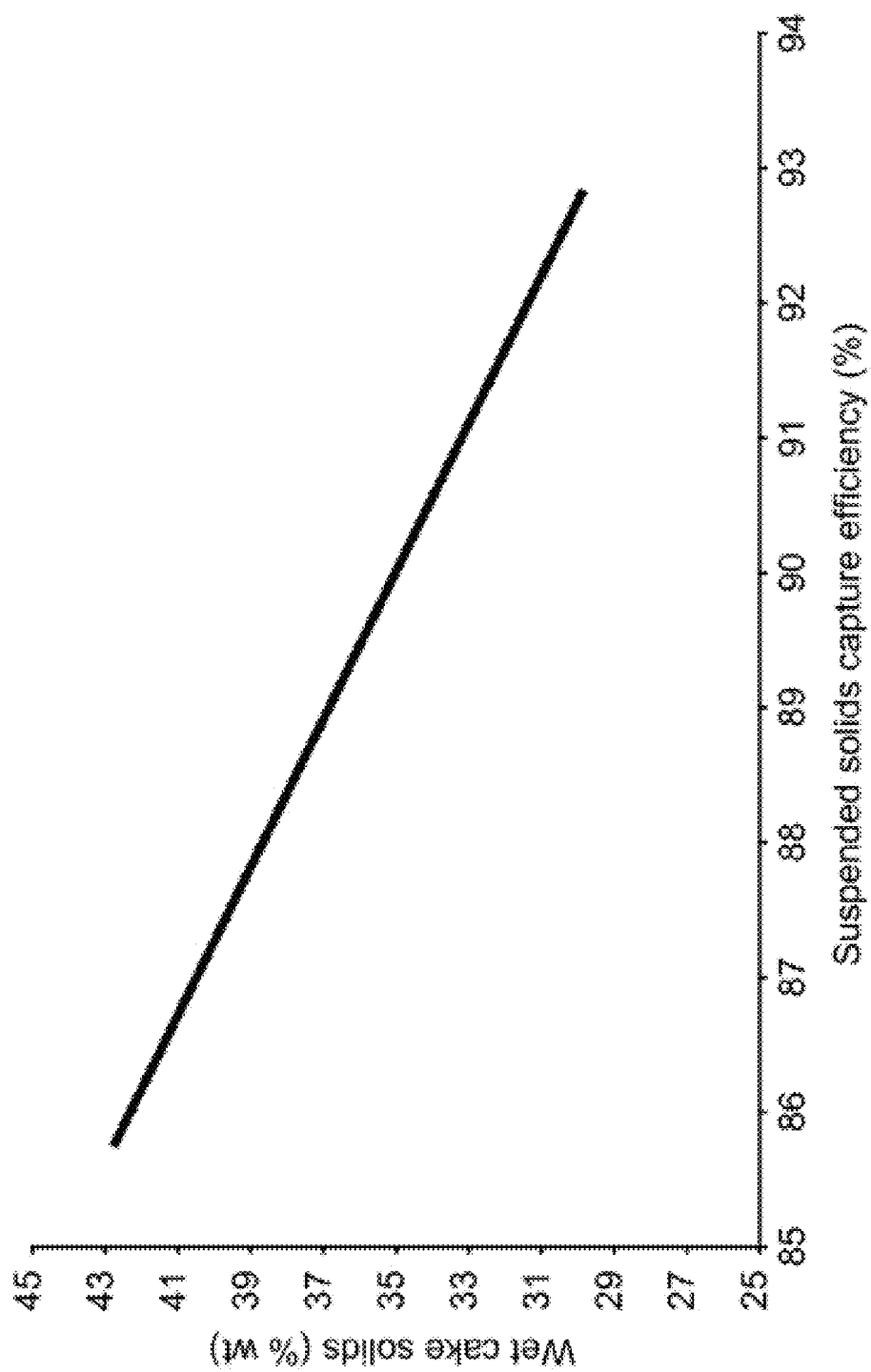
FIG. 5 illustrates the suspended solids removal efficiency versus the wet cake solids content.

FIG. 5 illustrates the suspended solids removal efficiency versus the wet cake solids content (D. A. Monceaux and D. Kuehner, "Dryhouse technologies and DDGS production," Chapter 21, The Alcohol Textbook, 5$^{th}$ Edition, 2009. Lallemand Ethanol Technology and Nottingham University Press). Having the ability to reduce the suspended solids in the centrate (i.e. increase the suspended solids capture efficiency) that feeds the evaporator while not worrying about the dryness of the wet cake would provide a significant benefit related to reduced evaporator fouling and the associated impact on operational capacity and energy efficiency.

The invention should now be illustrated with the following non-limiting examples.

EXAMPLES

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Example 1

Chemical Screening

The purpose of the testing was to: Test various dewatering aides for applicability related to patent application, obtain samples after washing and chemical addition, and obtain semi-quantitative analysis of WDG after lab scale testing.

Figure 6:
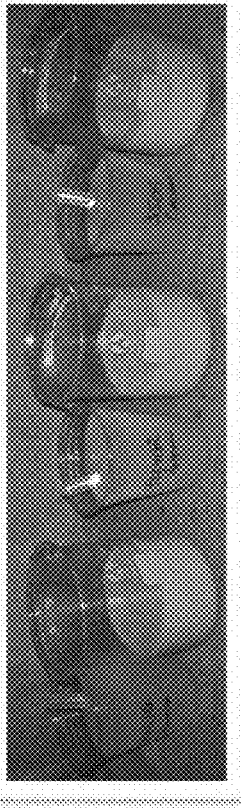
FIGS. 6-18 are digital photos showing experimental results from various dewatering experiments.

Six different chemicals were tested on thin stillage (centrate) to see if reactions occurred. Initial concentrations of 20 ppm were applied. The results are shown in the table below. The only chemical that exhibited reactions act this concentration was an anionic flocculent (USW MegaFloc 4451G). The results are shown in FIG. 6.

Figure 7:
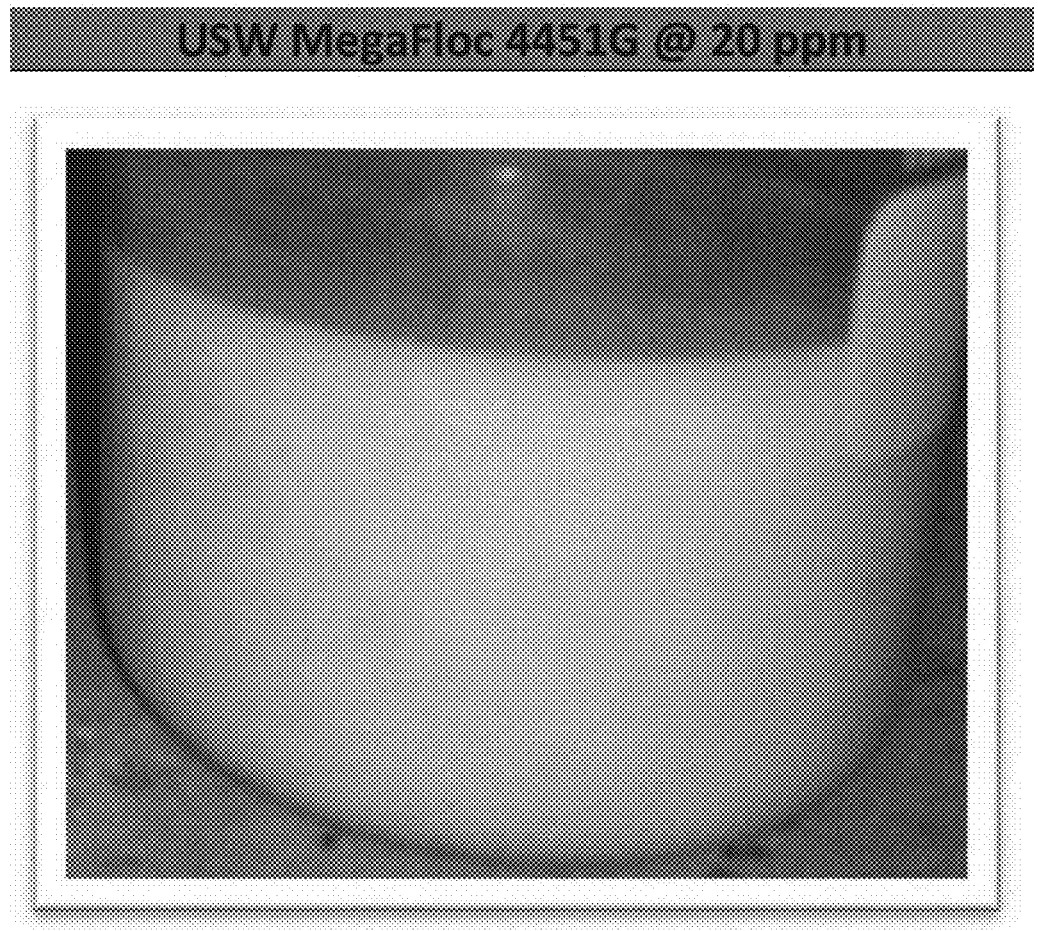
Figure 8:
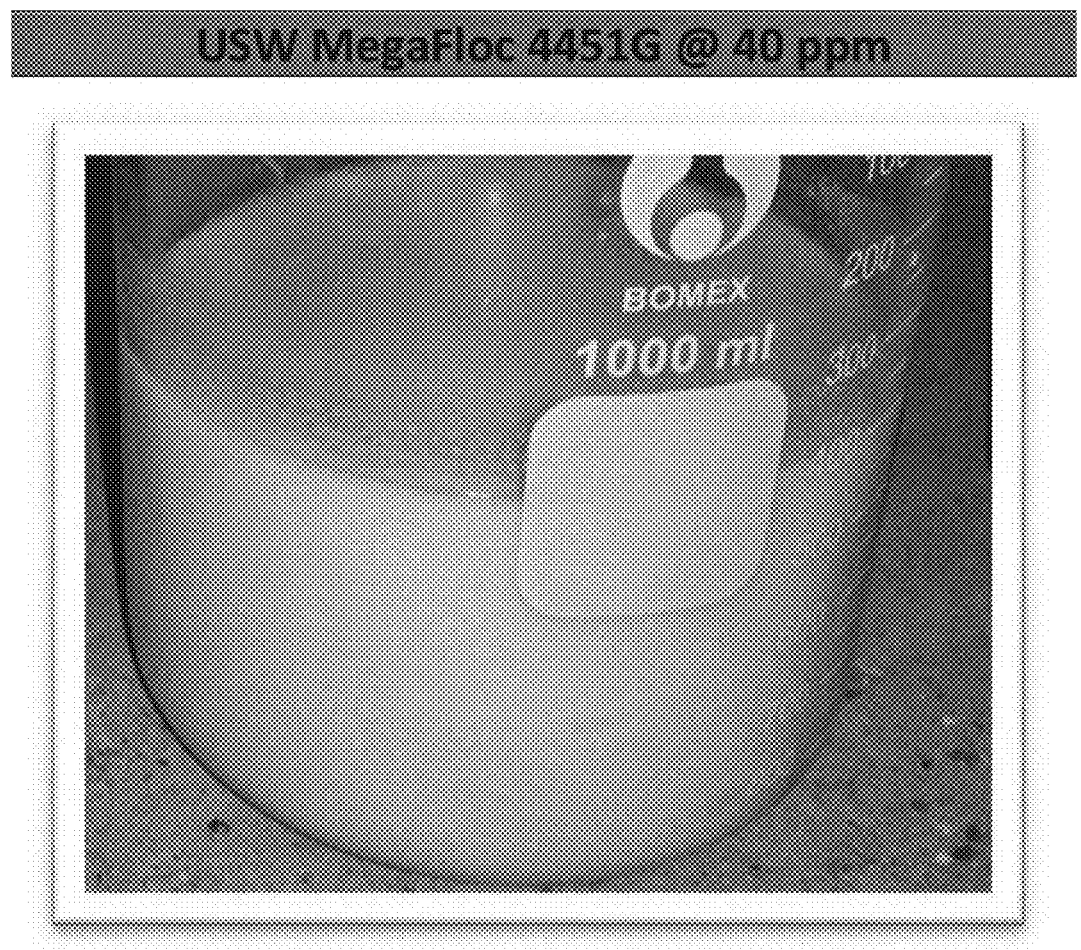

The pictures below in FIGS. 7-8 demonstrate that the separation appeared to be better at a 20 ppm dosage. To simplify future testing, USW MegaFloc 4451G was the only dewatering aide utilized. It shall be noted that various operating conditions may results in a different dewatering aide and or dosage.

Example 2

Dewatering Studies

Figure 9:
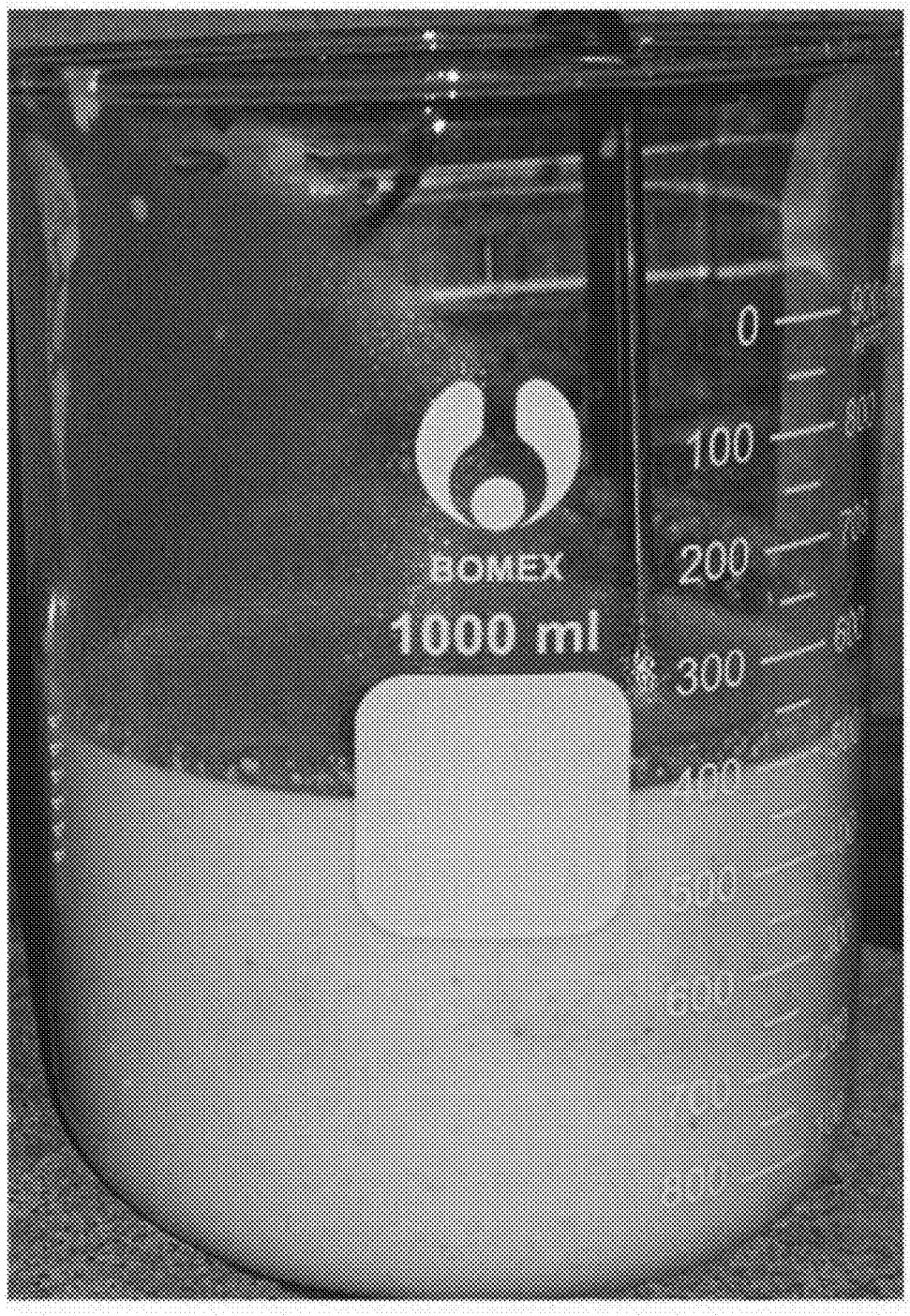

Various testing was conducted to determine the relative drain ability as well as appearance of the filtrate coming out of the perforated Buchner funnel. The first tests conducted utilized #1 Filter paper in the Buchner funnel; however, no filtration could take place. The purpose of the study was to determine the effect of "washing" the wet distillers grains (WDG) and apply a dewatering aide in an attempt to enable the use of a secondary water removal device (i.e. a screw press). Whole stillage (~12% total solids) was not able to be filtered in the perforated Buchner funnel. A picture of the whole stillage is shown in FIG. 9.

Figure 10:
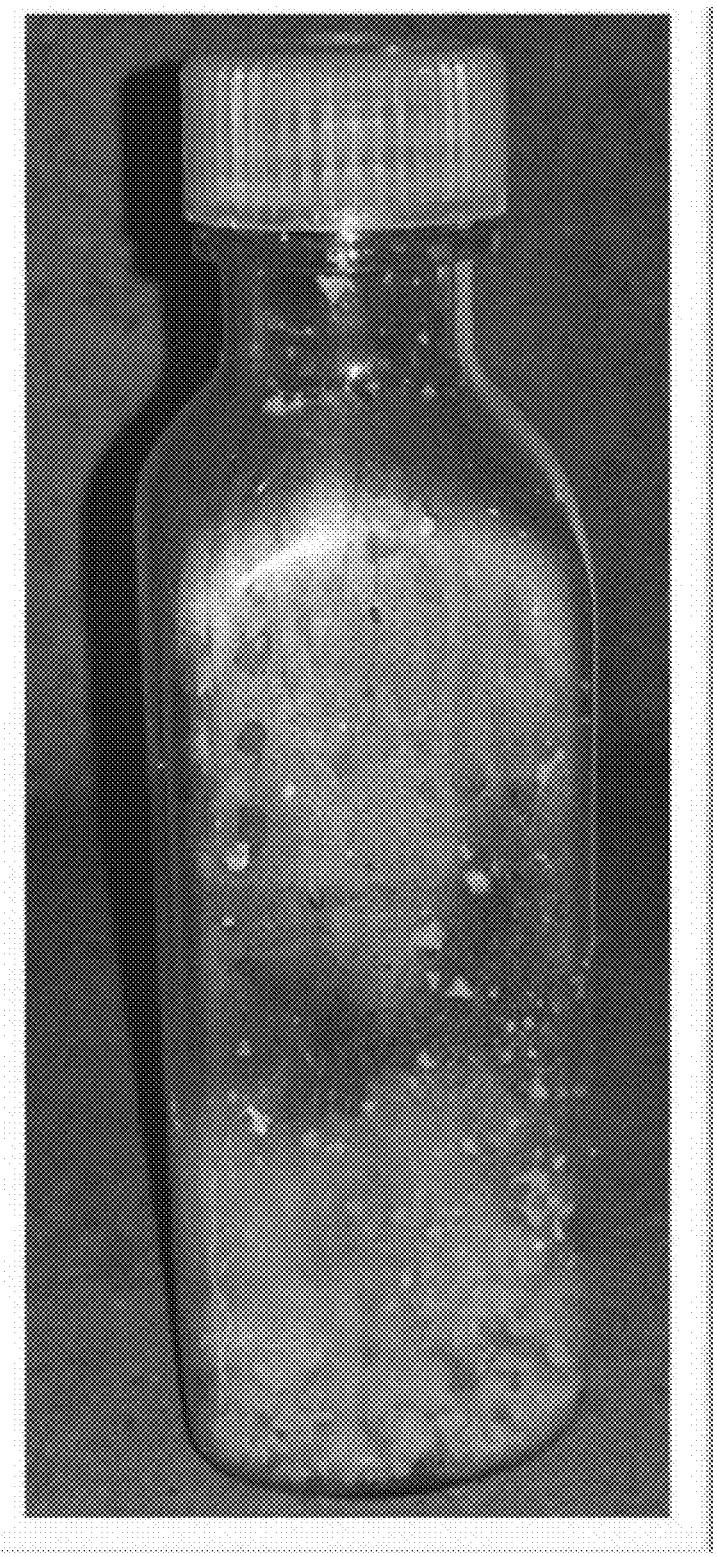

Approximately 1 lb. of wet distillers grains (WDG) was obtained and the solids content was approximately 33%. A picture of the wet distillers grains (WDG) is shown in FIG. 10.

Figure 11:
Figure 12:
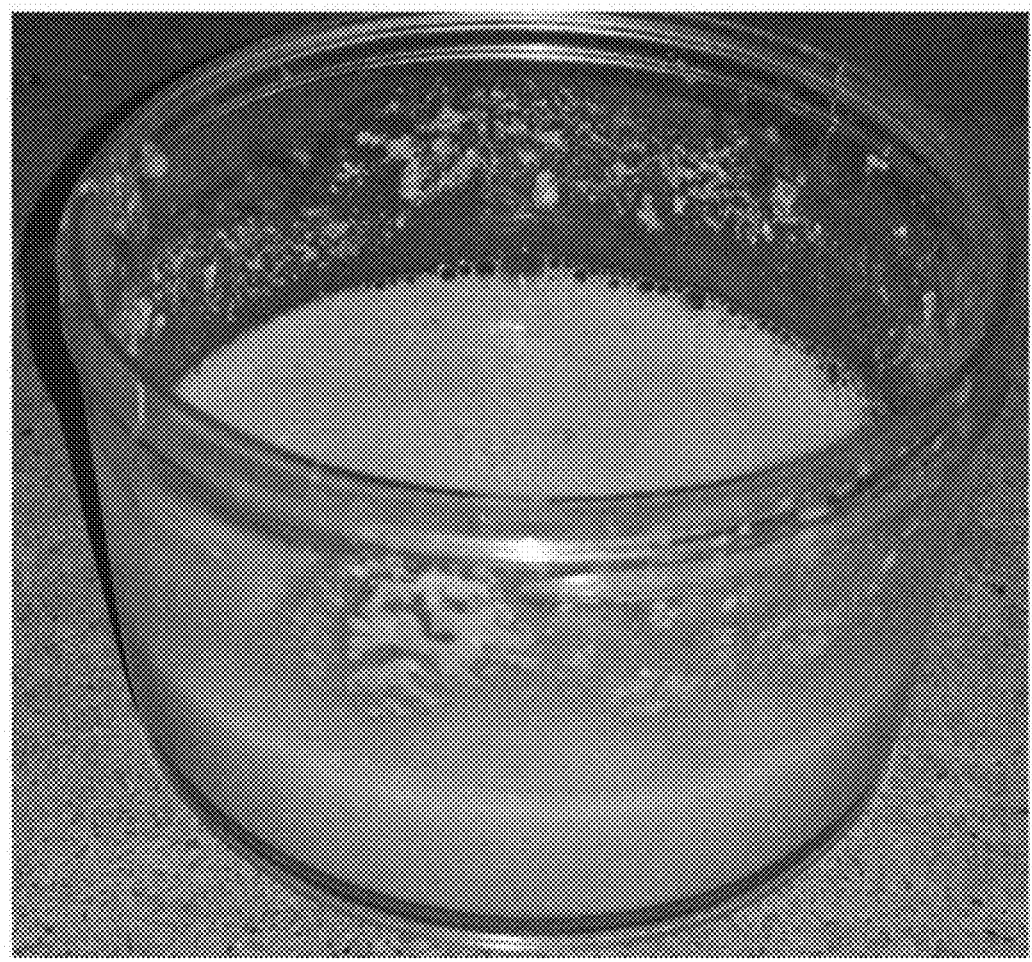
Figure 13:
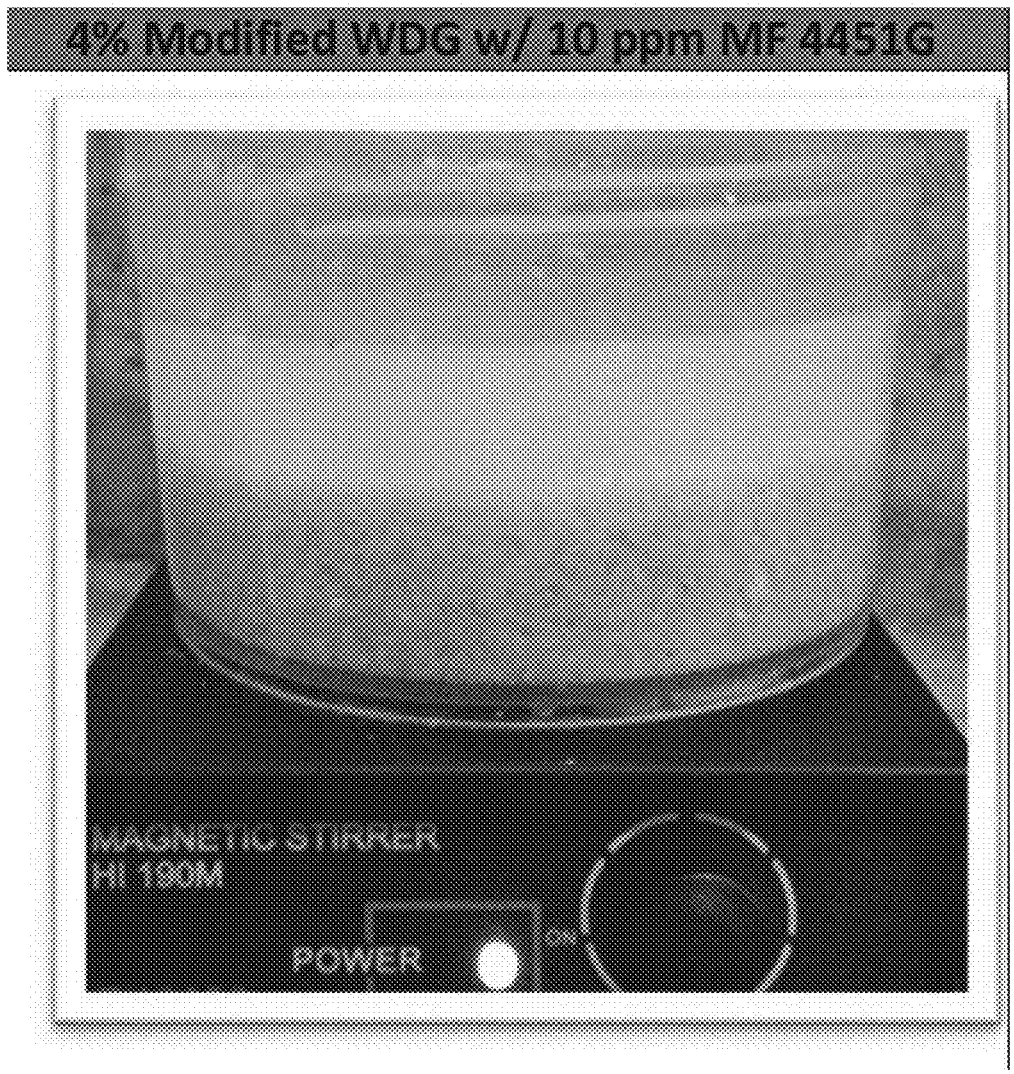
Figure 14:
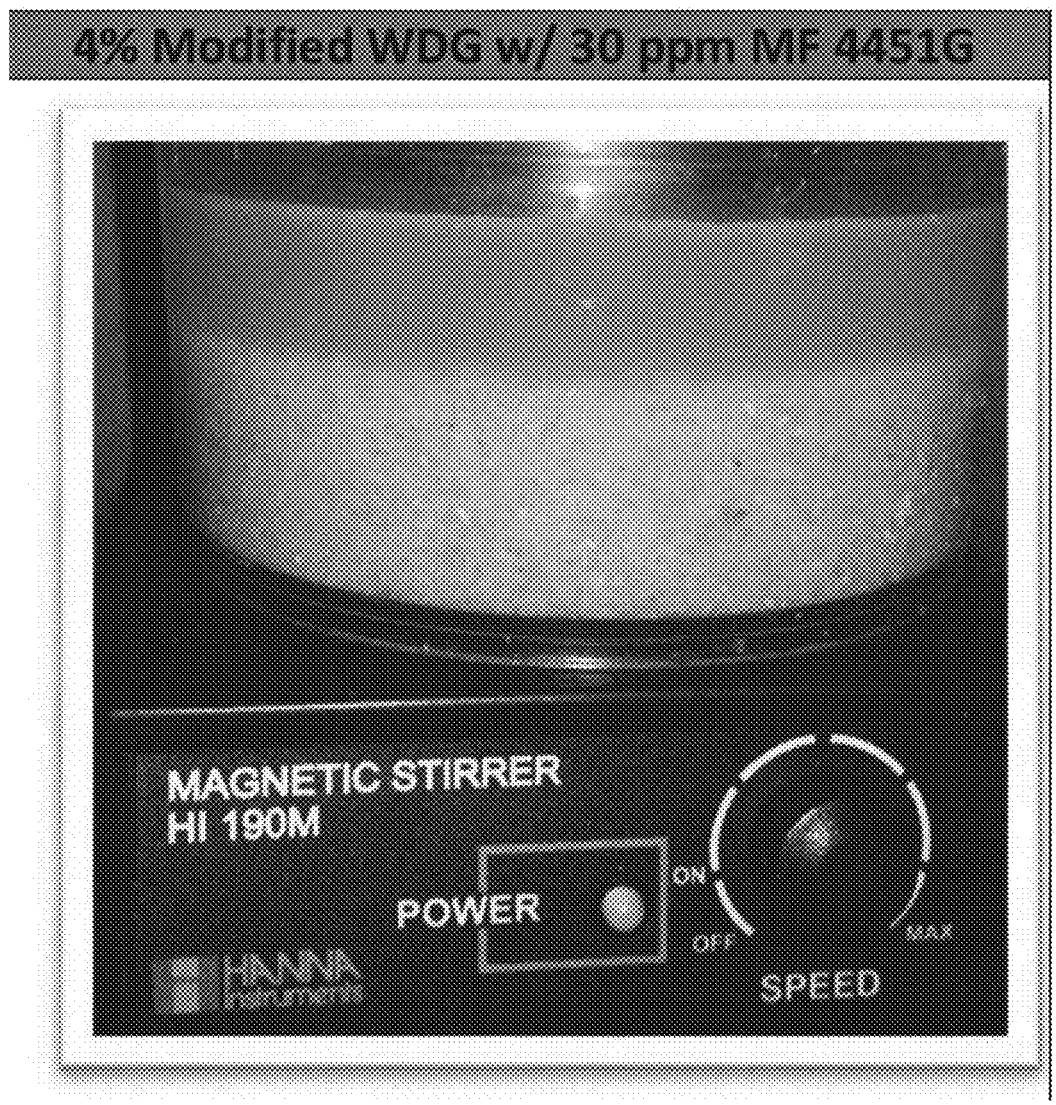

Various concentrations of wet distillers grains (WDG) were reconstituted with city water. The total solids content was lowered from the ~33% to 4% and 8%. The results for 4% modified wet distillers grains (WDG) are shown in FIG. 11. The results for 8% modified wet distillers grains (WDG) are shown in FIG. 12. These samples had the dewatering aide added at various concentrations. Their separations are shown below. It should be noted that the clarity of the decant layer is slightly better at the 10 ppm dose. The 4% modified wet distillers grains (WDG) with 10 ppm MF 4451G is shown in FIG. 13. The 4% modified WDG with 30 ppm MF 4451G is shown in FIG. 14.

Figure 15:
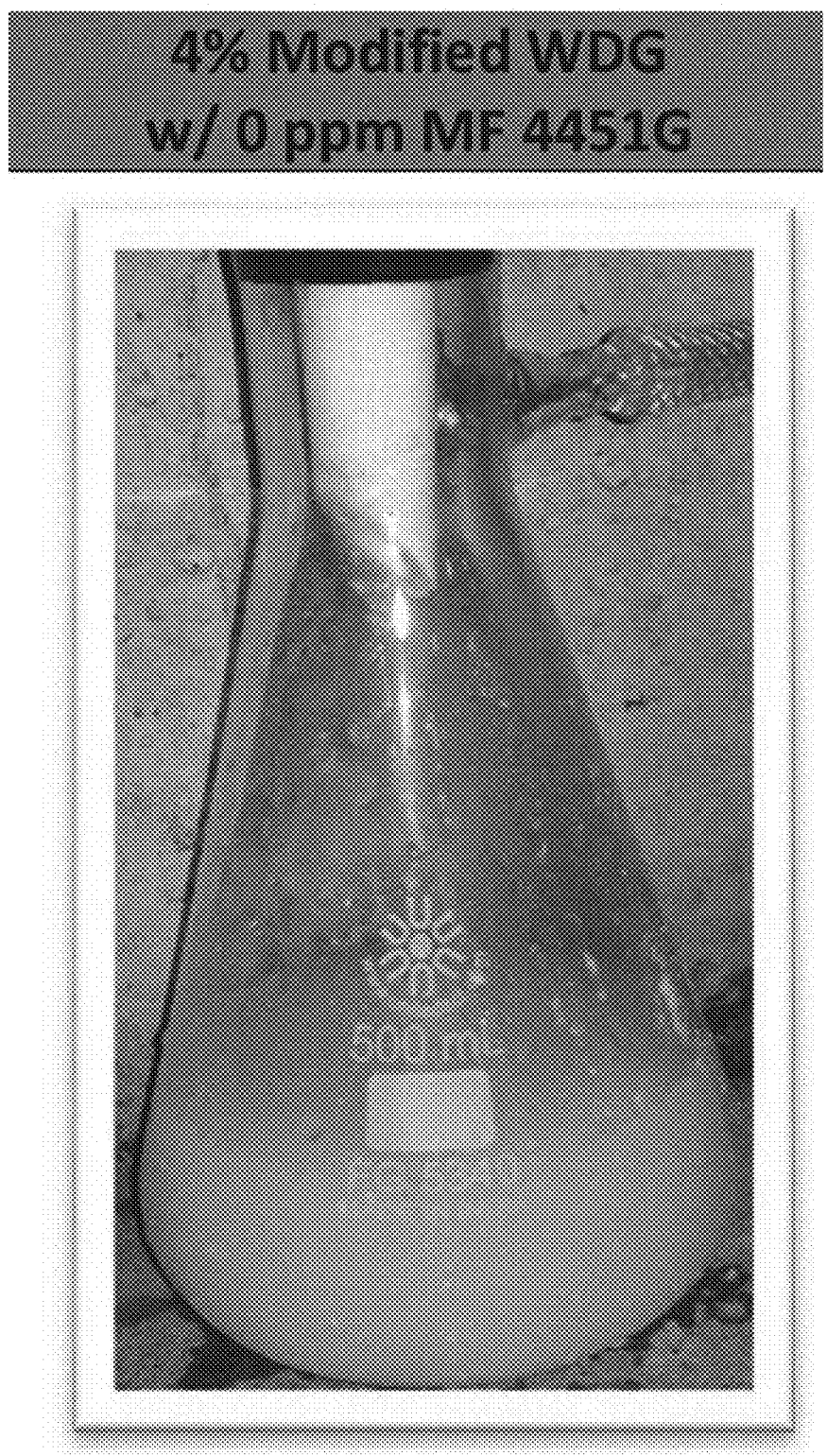
Figure 16:
Figure 17:
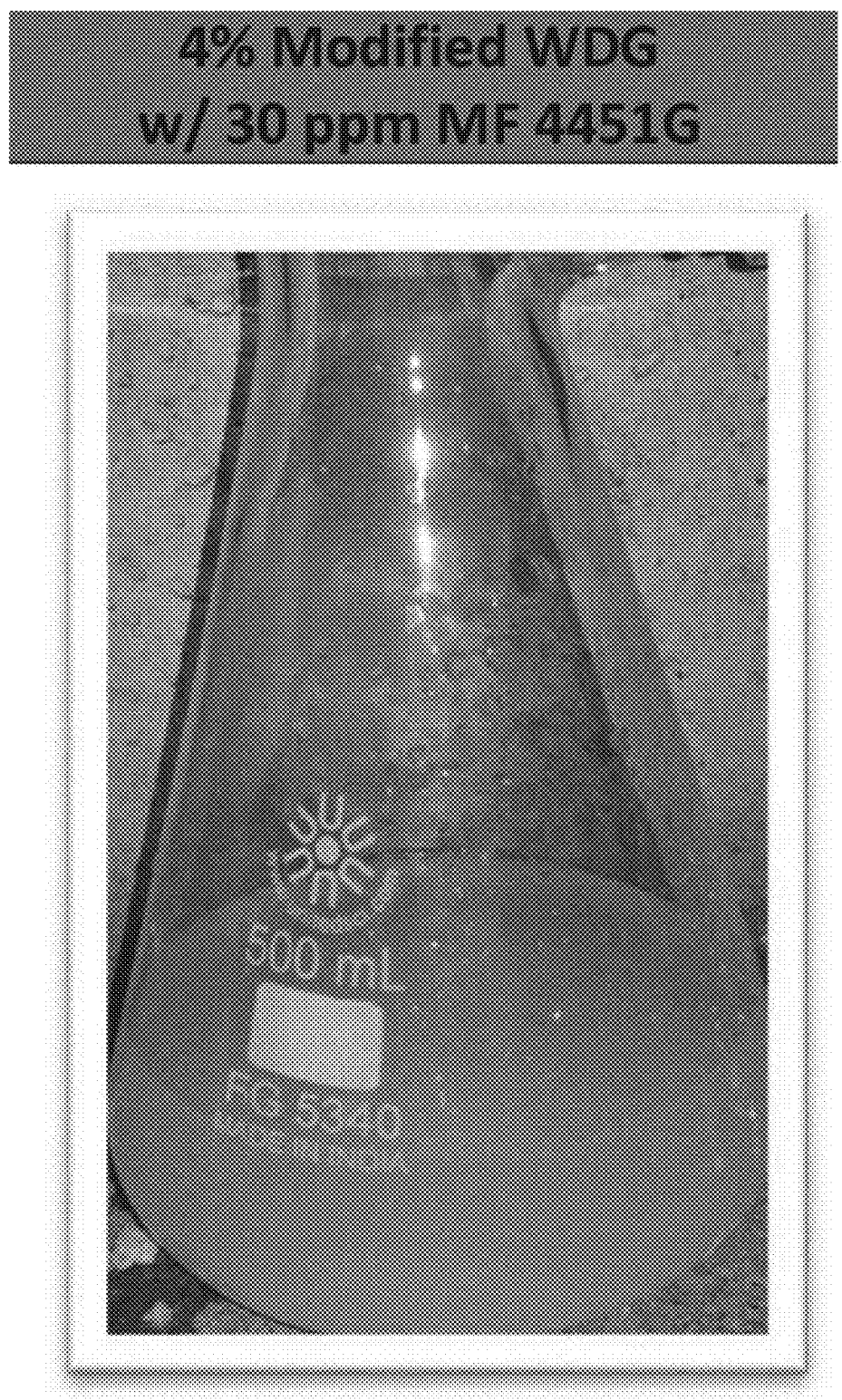
Figure 18:
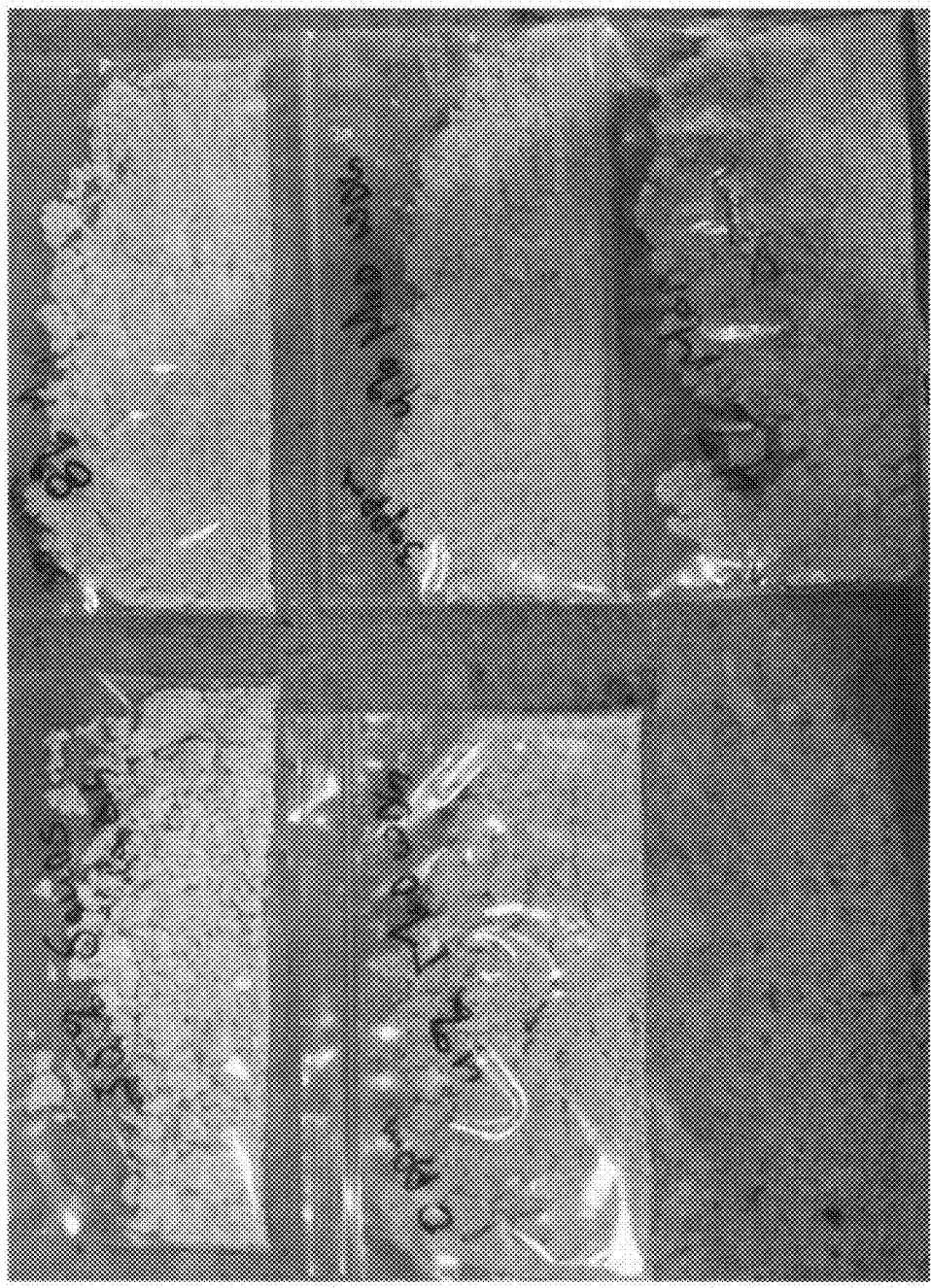

The modified wet distillers grains (WDG) (4% & 8% TS) were run through the perforated Buchner funnel without filter paper. A slight vacuum was pulled using a hand pump and the filtration was achieved via cake filtration. The filtrate clarity varied based on the concentration of the dewatering aide added. The clarity and chemical concentration were directly related where the greater the chemical concentration the better the clarity. The results are shown in FIGS. 15-17. The filter cake from the Buchner funnel was collected and analyzed. The pictures of the five cakes are shown in FIG. 18. The five filter cakes did not appear significantly different with the exception that the unwashed wet distillers grains (WDG) had a darker yellow color. The analytical results are shown in Table 2.

Table 2 shows the comparison of the crude protein content of the samples under various % TS and dewatering aide concentration. It can be seen that the 4% TS samples had improvements in the crude protein on a dry matter basis (relative to the untreated 35% wet distillers grains (WDG)). This is attributed to the reduction of the sugars, which is part of the dry matter, resulting from the rinse water. In addition, Table 2 shows the novel and desirable reduction in sugars (ethanol soluble carbohydrates and water soluble carbohydrates). The reduction of these values indicates that they have been removed from the solids and into the rinse water, which is recovered back into the fermentation process for beneficial conversion to additional ethanol. Along with the beneficial reuse of the sugars for increased production, their elimination from the wet cake helps reduce the stickiness of the wet cake as it dries to become Dry Distillers Grain (DDG). This leads to the beneficial characteristic of being less sticky so that the Dry Distillers Grain (DDG) reduces its tendency to adhere to the inner walls of the dryer so that there is less maintenance and a higher degree of safety associated with the operations of the dryers.

is explicitly defined by claim language. Recitation in a claim to the effect that first a step is performed several other steps are performed shall be taken to mean that the first step is performed before any of the other steps, but the other steps may be performed in any sequence unless a sequence is further specified within the other steps. For example, claim elements that recite "first A, B, C, and D, and lastly E" shall be construed to mean step A must be first, step E must be last, but steps B, C, and D may be carried out in any sequence between steps A and E and the process of that sequence will still fall within the four corners of the claim.

Furthermore, in the claims provided herein, specified steps may be carried out concurrently unless explicit claim language requires that they be carried out separately or as parts of different processing operations. For example, a claimed step of doing X and a claimed step of doing Y may be conducted simultaneously within a single operation, and the resulting process will be covered by the claim. Thus, a step of doing X, a step of doing Y, and a step of doing Z may be conducted simultaneously within a single process step, or in two separate process steps, or in three separate process steps, and that process will still fall within the four corners of a claim that recites those three steps.

Similarly, except as explicitly required by claim language, a single substance or component may meet more than a single functional requirement, provided that the single substance or component fulfills the more than one functional requirement as specified by claim language.

All patents, patent applications, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Additionally, all claims in this application, and all priority applications, including but not limited to original claims, are hereby incorporated in their entirety into, and form a part of, the written description of the invention.

Applicant reserves the right to physically incorporate into this specification any and all materials and information from any such patents, applications, publications, scientific articles, web sites, electronically available information, and other referenced materials or documents. Applicant reserves the right to physically incorporate into any part of this document, including any part of the written description, the claims referred to above including but not limited to any original claims.

TABLE 2

| Area | Unit | 35% WDG 015478 | 4% w/0 ppm 15482 | 4% w/10 ppm 15480 | 4% w/30 ppm 15481 | 8% w/30 ppm 15479 |
| --- | --- | --- | --- | --- | --- | --- |
| Crude Protein | % DM | 31.95% | 32.75% | 32.73% | 33.26% | 31.73% |
| Sugar (ESC) | % DM | 4.43% | 1.76% | 0.92% | 1.65% | 1.83% |
| Sugar (WSC) | % DM | 5.06% | 2.26% | 1.12% | 2.11% | 2.36% |

In the claims provided herein, the steps specified to be taken in a claimed method or process may be carried out in any order without departing from the principles of the invention, except when a temporal or operational sequence

What is claimed is:

1. An apparatus for dewatering a feed stream of aqueous solids residual from a fermentation and distillation process, the apparatus comprising:

a first separation device comprising a centrifuge to clarify a stream of aqueous solids into a first sub-stream and a second sub-stream:
a mixing tank in fluid connection with the first separation device to receive the first sub-stream and to provide a third sub-stream;
an evaporator in fluid communication to the first separation device to receive the second sub-stream and to provide a fourth sub-stream to the mixing tank;
a second separation device in fluid connection with the mixing tank to receive the third sub-stream and to clarify the third sub-stream into a fifth sub-stream and a sixth sub-stream, and
wherein the second separation device comprises a screw press, a centrifuge, a rotary vacuum-drum filter, or a belt filter press.

2. The apparatus of claim 1, wherein the first sub-stream comprises less than about 32 weight percent (wt %) total solids.

3. The apparatus of claim 1, wherein the centrifuge is a solid bowl decanter centrifuge.

4. The apparatus of claim 1, further comprising one or more pH adjusting apparatuses in fluid communication with the mixing tank.

5. The apparatus of claim 1, further comprising one or more boiler blowdown apparatuses in fluid communication with the mixing tank.

6. The apparatus of claim 1, further comprising one or more dewatering aide apparatuses in fluid communication with the mixing tank and the third sub-stream.

7. The apparatus of claim 1, further comprising a dryer in fluid communication with second separation device for drying the fifth sub-stream.

8. The apparatus of claim 7, wherein the evaporator is in fluid communication with the dryer and provides a syrup to the fifth sub-stream.

9. An apparatus for dewatering a feed stream of aqueous solids residual from a fermentation and distillation process, the apparatus comprising:
a first separation device comprising a centrifuge to clarify a stream of aqueous solids into a first sub-stream and a second sub-stream;
a mixing tank in fluid connection with the first separation device to receive the first sub-stream and to provide a third sub-stream;
an evaporator in fluid communication to the first separation device to receive the second sub-stream and to provide a fourth sub-stream to the mixing tank;
a second separation device in fluid connection with the mixing tank to receive the third sub-stream and to clarify the third sub-stream into a fifth sub-stream and a sixth sub-stream,
wherein the second separation device comprises a hydrocyclone, a screen bend, or a clarifier;
a third separation device in fluid connection with the second separation device and to receive the sixth sub-stream and to clarify the sixth sub-stream into a seventh sub-stream and an eighth sub-stream, and
wherein the third separation device comprises a screw press, a centrifuge, or a belt filter press.

10. The apparatus of claim 9, wherein the first sub-stream comprises less than about 32 weight percent (wt %) total solids.

11. The apparatus of claim 9, wherein the centrifuge is a solid bowl decanter centrifuge.

12. The apparatus of claim 9, further comprising one or more pH adjusting apparatuses in fluid communication with the mixing tank.

13. The apparatus of claim 9, further comprising one or more boiler blowdown apparatuses in fluid communication with the mixing tank.

14. The apparatus of claim 9, further comprising one or more dewatering aide apparatuses in fluid communication with the mixing tank and the sixth sub-stream.

15. The apparatus of claim 9, further comprising a dryer in fluid communication with third separation device for drying the seventh sub-stream.

16. The apparatus of claim 15, wherein the evaporator is in fluid communication with the dryer and provides a syrup to the seventh sub-stream.

17. An apparatus for dewatering a feed stream of aqueous solids residual from a fermentation and distillation process using corn or milo, the apparatus comprising:
a first separation device comprising a solid bowl decanter centrifuge to clarify a stream of aqueous solids into a first sub-stream and a second sub-stream,
wherein the first sub-stream comprises less than about 32 weight percent (wt %) total solids;
a mixing tank in fluid connection with the first separation device to receive the first sub-stream and to provide a third sub-stream;
an evaporator in fluid communication to the first separation device to receive the second sub-stream and to provide a fourth sub-stream to the mixing tank;
a second separation device comprising a hydrocyclone in fluid connection with the mixing tank to receive the third sub-stream and to clarify the third sub-stream into a fifth sub-stream and a sixth sub-stream;
a third separation device comprising a screw press in fluid connection with the second separation device and to receive the sixth sub-stream and to clarify the sixth sub-stream into a seventh sub-stream and an eighth sub-stream;
a dryer in fluid communication with third separation device for drying the seventh sub-stream,
wherein the evaporator is in fluid communication with the dryer and provides a syrup to the seventh sub-stream;
one or more pH adjusting apparatuses in fluid communication with the mixing tank;
one or more boiler blowdown apparatuses in fluid communication with the mixing tank; and
one or more dewatering aide apparatuses in fluid communication with the mixing tank and the sixth sub-stream.

18. The apparatus of claim 17, further comprising a first transfer pump in fluid communication with the second separation device and the mixing tank.

19. The apparatus of claim 17, further comprising a second transfer pump in fluid communication with the first separation device and a beer column.

20. The apparatus of claim 19, wherein the second transfer pump is to deliver the stream of aqueous solids from the beer column to the first separation device.

* * * * *